(12) United States Patent
Oshiki et al.

(10) Patent No.: US 8,366,616 B2
(45) Date of Patent: Feb. 5, 2013

(54) ULTRASONIC DIAGNOSTIC APPARATUS

(75) Inventors: Mitsuhiro Oshiki, Tokyo (JP); Ryuichi Shinomura, Tokyo (JP)

(73) Assignee: Hitachi Medical Corporation, Tokyo (JP)

(*) Notice: Subject to any disclaimer, the term of this patent is extended or adjusted under 35 U.S.C. 154(b) by 735 days.

(21) Appl. No.: 11/913,959

(22) PCT Filed: May 9, 2006

(86) PCT No.: PCT/JP2006/309302
§ 371 (c)(1),
(2), (4) Date: Nov. 10, 2008

(87) PCT Pub. No.: WO2006/121034
PCT Pub. Date: Nov. 16, 2006

(65) Prior Publication Data
US 2009/0076392 A1  Mar. 19, 2009

(30) Foreign Application Priority Data

May 9, 2005 (JP) ................................. 2005-136444
Jun. 23, 2005 (JP) ................................. 2005-183763

(51) Int. Cl.
*A61B 8/00* (2006.01)
(52) U.S. Cl. ......... 600/437; 600/443; 600/447; 600/459
(58) Field of Classification Search .................. 600/443, 600/444, 447, 459
See application file for complete search history.

(56) References Cited

U.S. PATENT DOCUMENTS

| 4,395,652 A * | 7/1983 | Nakanishi et al. ............ 310/334 |
| 4,962,667 A | 10/1990 | Ogawa et al. |
| 5,675,554 A * | 10/1997 | Cole et al. ..................... 367/138 |
| 7,611,462 B2 * | 11/2009 | Vortman et al. ............... 600/437 |
| 8,002,706 B2 * | 8/2011 | Vortman et al. ............... 600/437 |
| 2004/0160144 A1 | 8/2004 | Daft et al. |
| 2007/0016020 A1 * | 1/2007 | Oshiki et al. .................. 600/437 |

FOREIGN PATENT DOCUMENTS

| JP | 62-083656 | 4/1987 |
| JP | 06-237930 | 8/1994 |
| JP | 2004-274756 | 9/2004 |
| WO | WO 01/21072 A1 | 9/2000 |

* cited by examiner

*Primary Examiner* — Long V. Le
*Assistant Examiner* — Farshad Negarestan
(74) *Attorney, Agent, or Firm* — Antonelli, Terry, Stout & Kraus, LLP.

(57) ABSTRACT

For realization of an ultrasonic diagnostic apparatus capable of satisfactorily narrowing a beam width while suppressing an increase in the number of focus data, an ultrasonic diagnostic apparatus is designed to include an ultrasonic probe 10 that transmits or receives ultrasonic waves to or from a subject, a transmission unit 12 that supplies a driving signal to the ultrasonic probe 10, a reception unit 16 that handles a received signal sent from the ultrasonic probe 10, a unit 18 that reconstructs an ultrasonic image on the basis of a signal sent from the reception unit 16, and a unit 20 that displays the ultrasonic image. The ultrasonic diagnostic apparatus further includes an element selection unit 22 that selects a plurality of driving oscillatory elements, which constitutes an aperture through which ultrasonic waves are transmitted or received, from among a plurality of oscillatory elements that constitutes the ultrasonic probe 10 and transforms ultrasonic waves into electric signals or vice versa. The element selection unit 22 groups the plurality of driving oscillatory elements into a plurality of sets, each of which includes one driving oscillatory element or a plurality of adjoining driving oscillatory elements, according to the depth of a focal point.

14 Claims, 21 Drawing Sheets

SHORT-AXIS DIRECTION Y

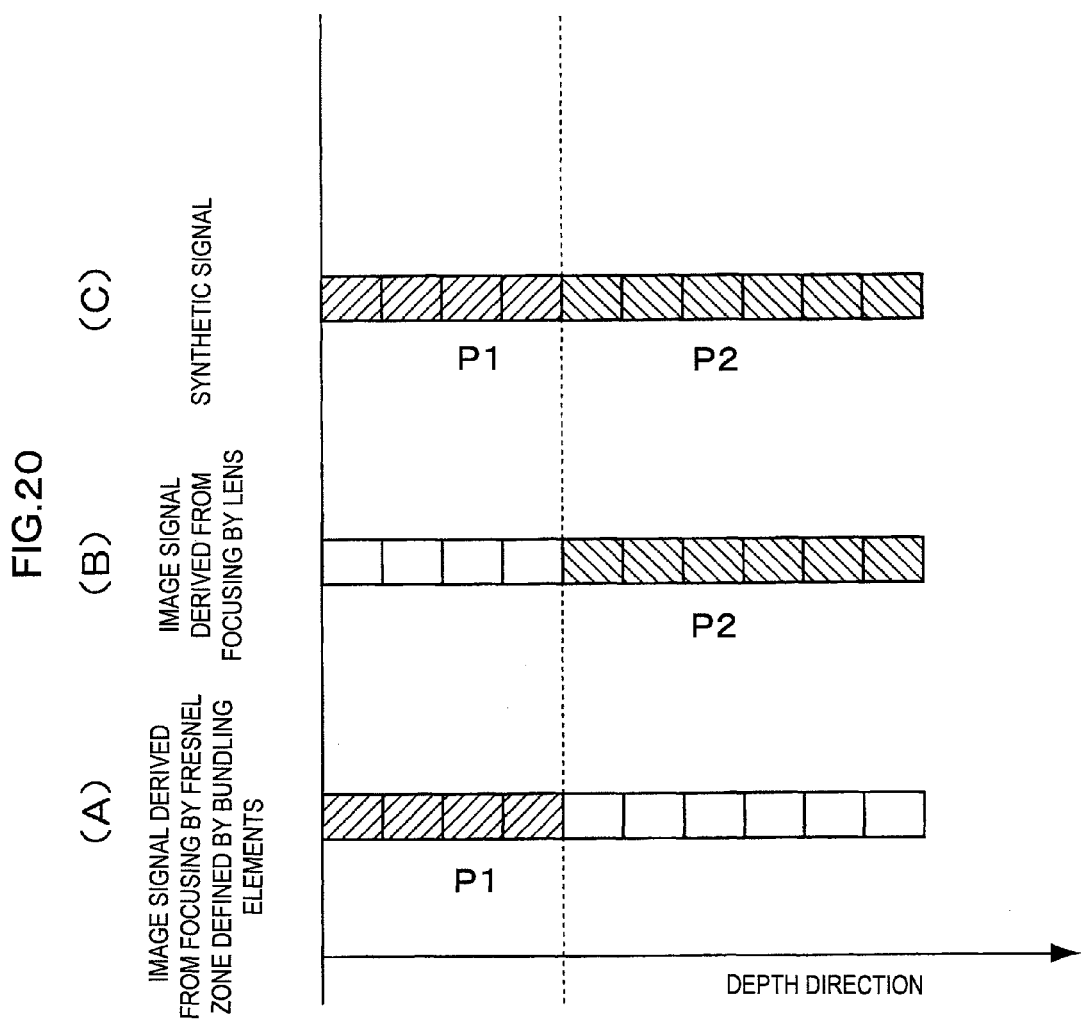

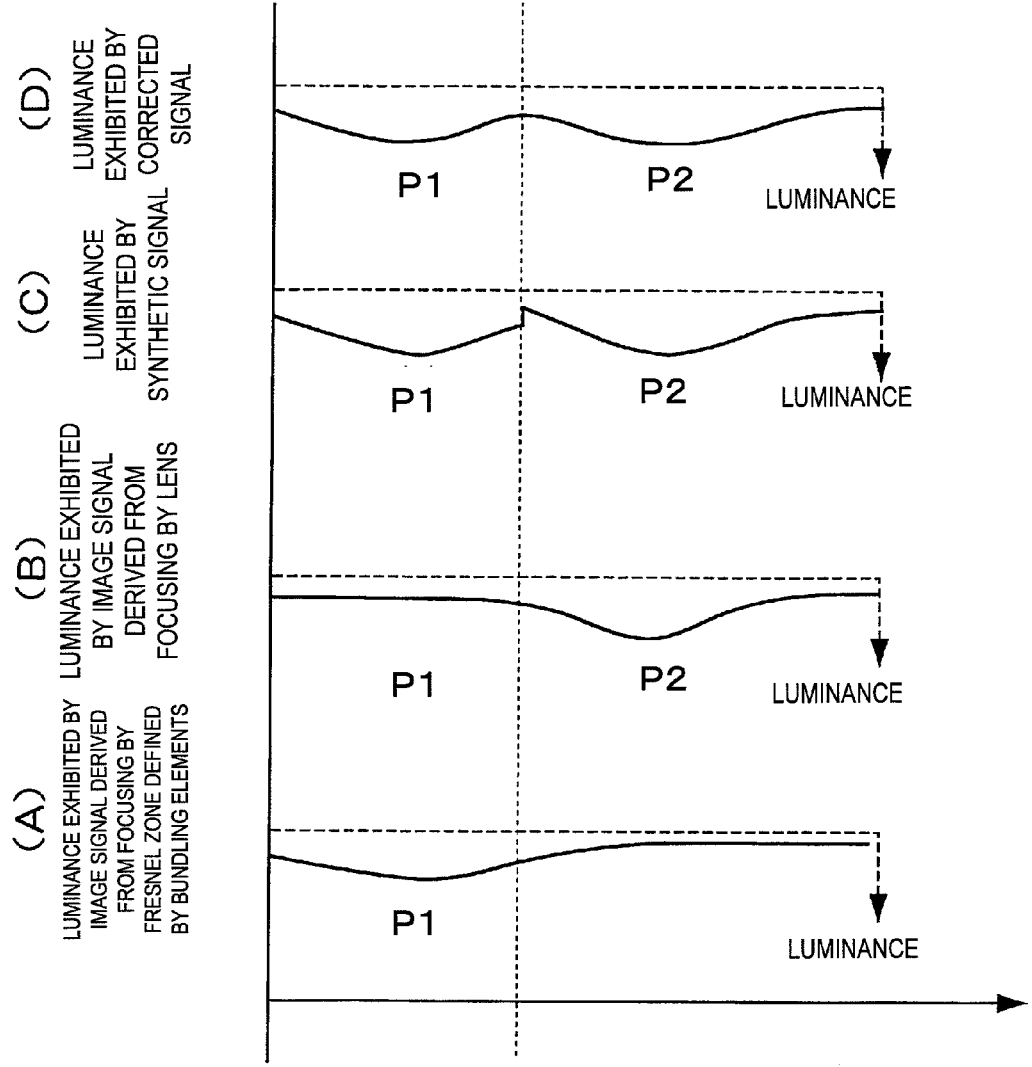

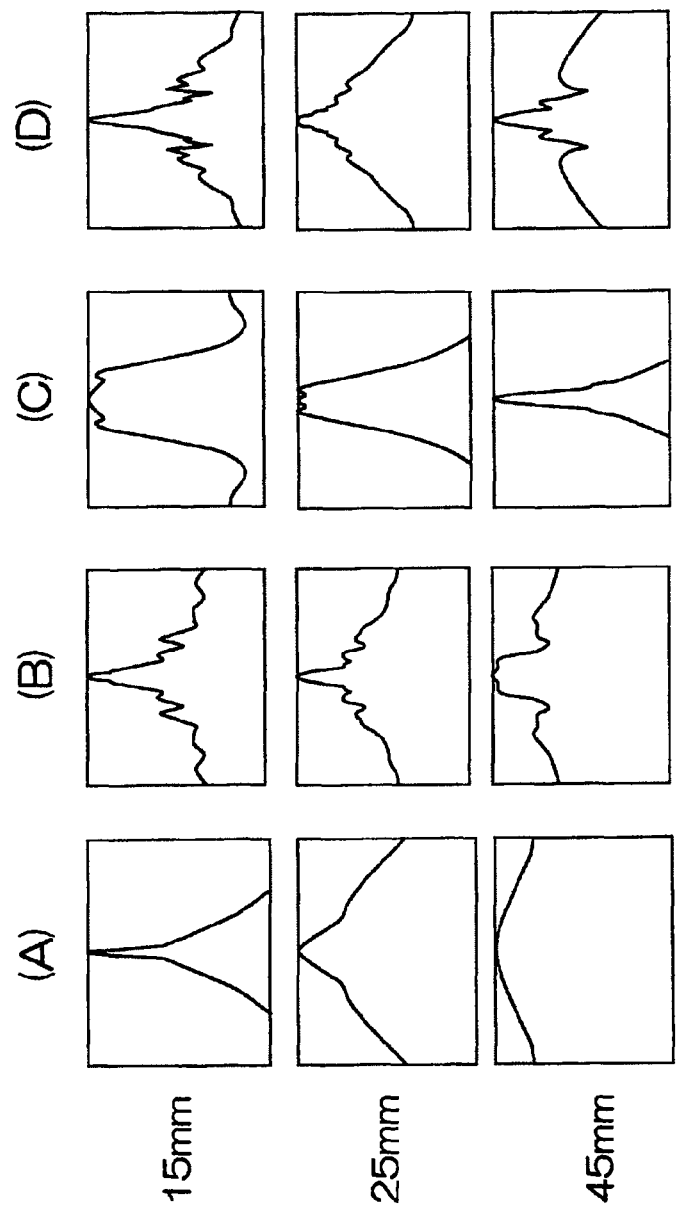

ULTRASONIC DIAGNOSTIC APPARATUS

TECHNICAL FIELD

The present invention relates to an ultrasonic diagnostic apparatus that produces an ultrasonic image as a diagnostic image of a subject.

BACKGROUND ART

Ultrasonic diagnostic apparatuses that produce an ultrasonic image as a diagnostic image of a subject transmit or receive ultrasonic waves to or from a subject via an ultrasonic probe, and reconstruct an ultrasonic image of the subject on the basis of a received signal sent from the ultrasonic probe. Known as the ultrasonic probe is a probe that has a plurality of oscillatory elements, which transforms ultrasonic waves into electric signals or vice versa, arrayed and that selects a plurality of driving oscillatory elements that defines an aperture through which ultrasonic waves are transmitted or received.

The resolution of an ultrasonic image depends on the width or diameter of an ultrasonic beam, which is transmitted or received by an ultrasonic probe, at a focal point P (hereinafter, generically, referred to as a beam width). In other words, when the beam width is narrowed in order to improve an azimuthal resolution, the image resolution improves.

For reduction of the beam width, a focusing technology is known. For example, assuming that the distance of a driving oscillatory element A, which is located in the center of the aperture, to a focal point P is a reference distance, a difference $\Delta L$ between the distance of any other driving oscillatory element B to the focal point P and the reference distance is calculated. The distance difference $\Delta L$ is proportional to a lag time spent to match the phases of ultrasonic waves. Focus data associated with the distance difference $\Delta L$ is prepared in advance. Transmission or reception of ultrasonic waves by the driving oscillatory elements A and B is caused to lag on the basis of the prepared focus data. Thus, the phases of ultrasonic waves are matched at the focus point P in order to reduce the beam width (refer to, for example, patent document 1 (JP-A-2004-274756)).

In the technology described in the patent document 1, the space (pitch) between adjoining driving oscillatory elements, such as, the driving oscillatory elements A and B is fixed to a certain value, and the driving oscillatory elements are not designated for each focal depth. Moreover, the distance difference $\Delta L$ varies depending on the depth position of the focal point P. Consequently, a method that prepares a plurality of focus data in association with different values of the distance difference $\Delta L$ is conceivable. However, according to this method, since the number of focus data is enormous, a memory capacity required to preserve the focus data increases, or anyway, a circuit scale increases.

Moreover, as a technology for reducing the beam width, focus control based on a so-called Fresnel zone to be created by bundling oscillatory elements is known. For example, a plurality of oscillatory elements are grouped into sets each including one oscillatory element or multiple adjoining oscillatory elements. A different phase is assigned in units of a set on the basis of a difference in a distance of each set to a focal point. Consequently, the phases of ultrasonic waves to be transmitted or received by the sets are matched at the focal point in order to thus reduce the beam width (refer to, for example, patent document 2 (U.S. Patent No. 2004/0160144)).

However, in the method described in the patent document 2, although a beam width is narrowed at a focal point, the beam width gradually expands along with an increase in a depth from the focal point. This may deteriorate image quality or degrade the resolution of an image expressing a deep region of a subject.

Moreover, when a focal point is set to a relatively deep position, the distance to the focal point gets enough larger than the distance between adjoining elements or adjoining sets. Consequently, the distances to the focal point from respective elements or sets are sometimes considered to be substantially the same. In this case, Fresnel-zone focus control based on a difference between the distances of sets to a focal point becomes hard to achieve. Consequently, there arises a fear that image quality may be deteriorated, or anyway, the resolution of an image expressing a deep region of a subject may be degraded.

An object of the present invention is to realize an ultrasonogaph capable of satisfactorily reducing a beam width while suppressing an increase in the number of focus data.

DISCLOSURE OF THE INVENTION

In order to accomplish the object of the present invention, there is provided an ultrasonic diagnostic apparatus including an ultrasonic probe that transmits or receives ultrasonic waves to or from a subject, a transmitting means for supplying a driving signal to the ultrasonic probe, a receiving means for handling a received signal sent from the ultrasonic probe, a means for reconstructing an ultrasonic image on the basis of a signal sent from the receiving means, and a means for displaying the ultrasonic image. The ultrasonic diagnostic apparatus further includes an element selecting means for selecting a plurality of driving oscillatory elements, which defines an aperture through which ultrasonic waves are transmitted or received, from among a plurality of oscillatory elements that transforms ultrasonic waves into electric signals or vice versa and that constitute the ultrasonic probe. The element selecting means groups the plurality of driving oscillatory elements into a plurality of sets each including one driving oscillatory element or a plurality of adjoining driving oscillatory elements according to a depth of a focal point.

The element selecting means regards as a reference distance the distance of a set located in the center of the aperture to a focal point. The element selecting means calculates a difference between the distance of any other group to the focal point and the reference distance, and determines the number of sets and the numbers of driving oscillatory elements belonging to the sets so that the distance difference will fall within a permissible range designated based on the wavelength $\lambda$ of the ultrasonic waves.

Moreover, an ultrasonic diagnostic apparatus includes an ultrasonic probe that transmits or receives ultrasonic waves to or from a subject, a transmitting means for supplying a driving signal to the ultrasonic probe, a receiving means for handling a received signal sent from the ultrasonic probe, a means for reconstructing an ultrasonic image on the basis of the signal sent from the receiving means; and a means for displaying the ultrasonic image. The ultrasonic diagnostic apparatus further includes an element selecting means for selecting a plurality of driving oscillatory elements, which define an aperture through which ultrasonic waves are transmitted or received, from among a plurality of oscillatory elements that transforms ultrasonic waves into electric signal or vice versa and that constitutes the ultrasonic probe. The element selecting means determines the number of driving oscillatory elements belonging to a predetermined set every time the position of a focal point is changed from one to another.

The ultrasonic diagnostic apparatus further includes a focus control means for controlling a phase in units of a set so as to produce an ultrasonic beam having a first focus and an ultrasonic beam having a second focus whose depth is larger than the depth of the first focus, and a synthesizing means for joining a signal which expresses a shallow region of a subject and is a component of a signal received in return for the first ultrasonic beam, and a signal, which expresses a deep region of the subject and is a component of a signal received in return for the second ultrasonic beam, so as to produce ultrasonic image data.

An ultrasonic diagnostic apparatus includes an ultrasonic probe that transmits or receives ultrasonic waves to or from a subject, a transmitting means for supplying a driving signal to the ultrasonic probe, a receiving means for handling a received signal sent from the ultrasonic probe, an image processing means for reconstructing an ultrasonic image on the basis of the signal sent from the receiving means, and a display means for displaying the ultrasonic image. The ultrasonic probe has a plurality of oscillatory elements, which transforms ultrasonic waves into electric signals or vice versa, arrayed rectangularly, and includes opposite electrodes that are grouped in a short-axis direction orthogonal to the axis of the rectangular array. The ultrasonic probe has an acoustic lens disposed on an ultrasonic-waves transmitting/receiving side thereof. The opposite electrodes grouped in the short-axis direction are grouped into a plurality of sets. The ultrasonic diagnostic apparatus further includes a focus control means for controlling a phase in units of a set so as to produce an ultrasonic beam having a first focus, and using the acoustic lens to produce an ultrasonic beam having a second focus whose depth is larger than the depth of the first focus, and a synthesizing means for joining a signal, which expresses a shallow region of the subject and is a component of a signal received in return for the first ultrasonic beam, and a signal, which expresses a deep region of the subject and is a component of a signal received in return for the second ultrasonic beam, so as to produce ultrasonic image data.

BRIEF DESCRIPTION OF THE DRAWINGS

FIG. 20 is an explanatory diagram concerning the operation of a synthesizing means included in the ultrasonic probe shown in FIG. 12;

FIG. 21 is an explanatory diagram concerning the operation of a luminance correcting means included in the synthesizing means shown in FIG. 12; and FIG. 22 shows patterns of an ultrasonic beam to be transmitted or received by the ultrasonic probe shown in FIG. 12, and patterns of comparative examples.

BEST MODE FOR CARRYING OUT THE INVENTION (First Embodiment)

The first embodiment of an ultrasonic diagnostic apparatus in accordance with the present invention will be described with reference to the drawings.

Figure 1:
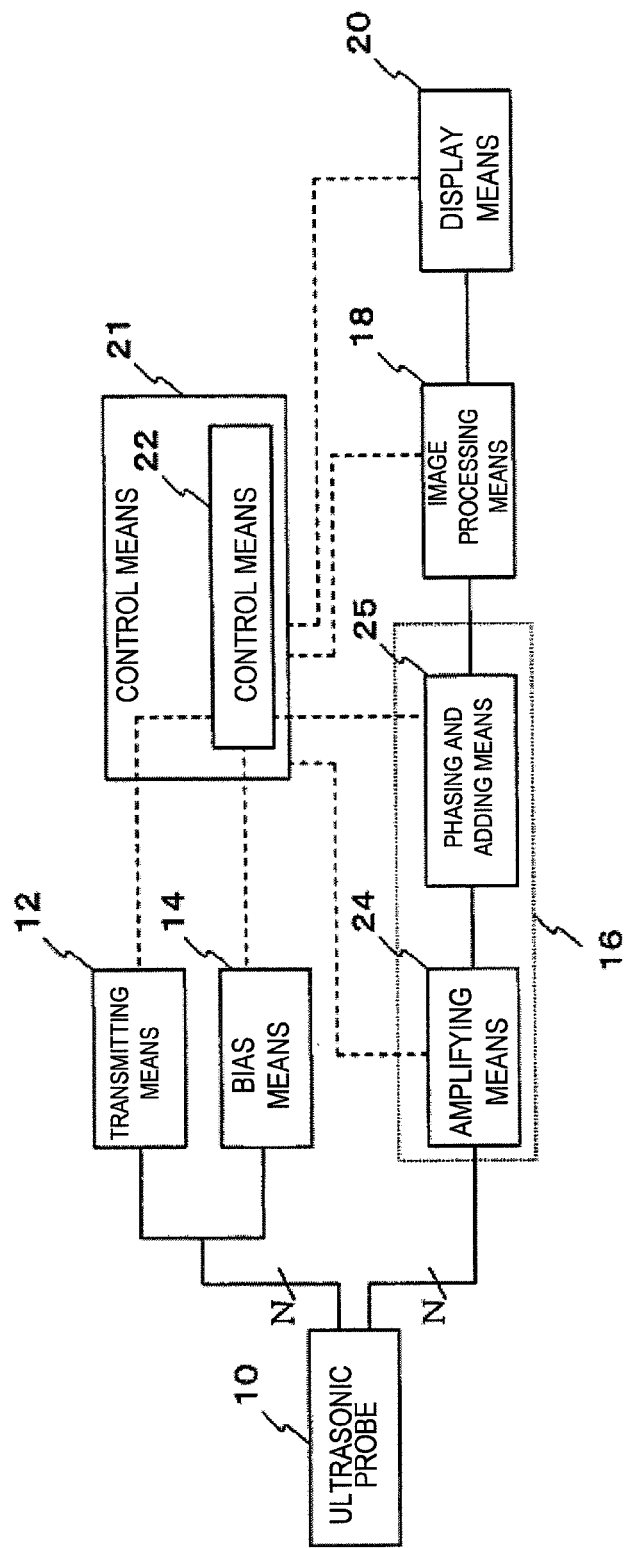
FIG. 1 is a block diagram showing the configuration of an ultrasonic diagnostic apparatus in accordance with the first embodiment of the present invention.

FIG. 1 is a block diagram showing the configuration of an ultrasonic diagnostic apparatus in accordance with an embodiment of the present invention. As shown in FIG. 1, the ultrasonic diagnostic apparatus includes an ultrasonic probe 10 (hereinafter called a probe 10) that transmits or receives ultrasonic waves to or from a subject, a transmitting means 12 for supplying a driving signal to the probe 10, a bias means 14 for applying a dc bias while convoluting the dc bias to the driving signal to be fed to the probe 10, a receiving means 16 for handling a received signal sent from the probe 10, an image processing means 18 for reconstructing an ultrasonic image on the basis of the signal sent from the receiving means 16, and a display means 20 for displaying the ultrasonic image sent from the image processing means 18.

Incidentally, a control means 21 is included for transmitting a control command to each of the transmitting means 12, bias means 14, receiving means 16, image processing means 18, and display means 20. The receiving means 16 includes an amplifying means 24 for amplifying the received signal sent from the probe 10, and a phasing and adding means 25 for phasing and adding received signals sent from the amplifying means 24.

In the ultrasonic diagnostic apparatus in accordance with the present invention, the probe 10 includes multiple oscillatory elements that transform ultrasonic waves into electric signals or vice versa. An element selecting means 22 is included for selecting multiple driving oscillatory elements, which transmit or receive ultrasonic waves, from among the oscillatory elements. The element selecting means 22 groups the multiple driving oscillatory elements into multiple sets each including one driving oscillatory element or multiple adjoining driving oscillatory elements. Assuming that the distance of one set, which is located in the center of the probe in a short-axis direction, to a focal point P is regarded as a reference distance L, a difference ΔL between a distance L' of any other group to the focal point P and the reference distance L is calculated. The number of sets and the numbers of driving oscillatory elements belonging to the sets are determined so that the distance difference ΔL will fall within a permissible range designated based on the wavelength λ of ultrasonic waves (for example, a range of an integral multiple of λ/2±α). Incidentally, the element selecting means 22 shall be included in the control means 21 but may not be included therein.

The ultrasonic diagnostic apparatus in accordance with the present embodiment is a system that varies the pitch between adjoining sets on the basis of the position of the focal point P of an ultrasonic beam, which is transmitted or received by the probe 10, and the wavelength λ of ultrasonic waves. The pitch between adjoining sets is the space between the center position of one set located in the center and the center position of any other set. The set may include a sole driving oscillatory element or may include multiple driving oscillatory elements.

Figure 2:
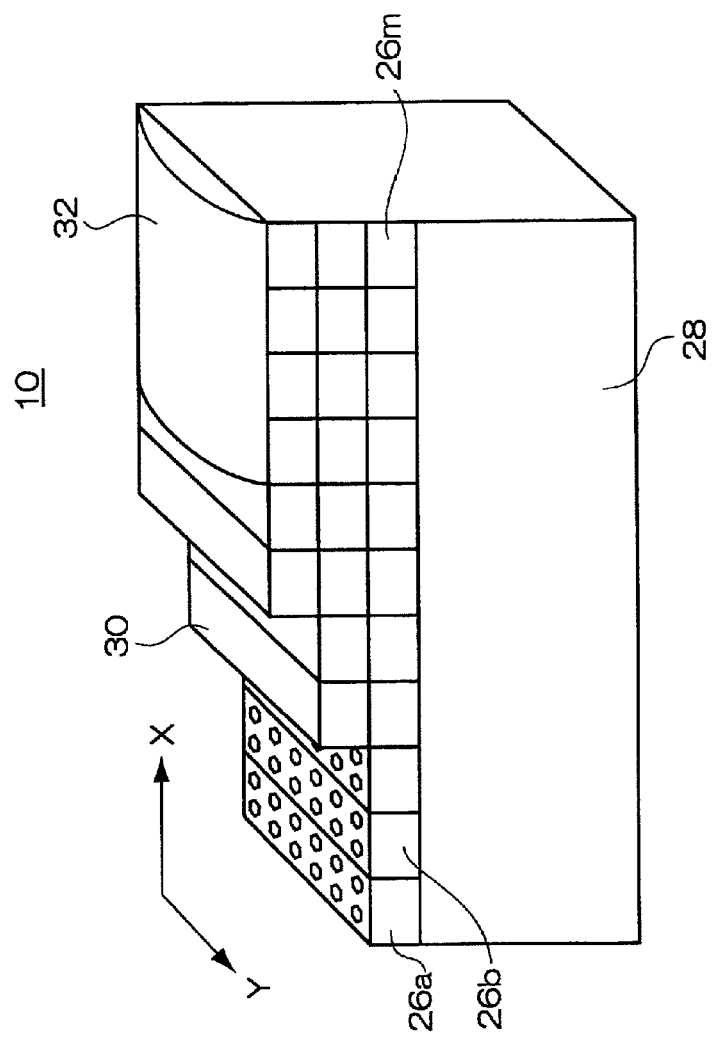
FIG. 2 is an explanatory diagram showing the structure of an ultrasonic probe shown in FIG. 1.

The ultrasonic diagnostic apparatus will be described in more detail. FIG. 2 is an explanatory diagram showing the structure of the probe 10 shown in FIG. 1. As shown in FIG. 2, the probe 10 has multiple transducers 26a to 26m (m denotes an integer equal to or larger than 2) arrayed rectangularly in the form of a one-dimensional array. However, the present invention can be applied to an ultrasonic probe of a two-dimensional array type having the transducers 26a to 26m arrayed two-dimensionally or an ultrasonic probe of a convex type having the transducers 26a to 26m arrayed in a sector form. A matching layer 30 is accumulated on the ultrasonic-wave emission surfaces of the transducers 26a to 26m. An acoustic lens 32 is formed on the subject side of the matching layer 30. Moreover, a backing 28 is layered on the backs of the transducers 26a to 26m.

The transducer 26a has multiple oscillatory elements set in array. Each of the multiple oscillatory elements transforms a driving signal, which is fed from the transmitting means 12, into an ultrasonic wave, and transmits the ultrasonic wave to a subject, or receives an ultrasonic wave echoed from the subject, and transforms the ultrasonic wave into an electric signal. The same applies to the transducers 26b to 26m. The backing 28 absorbs propagating ultrasonic waves emitted from the transducers 26a to 26m to their backs, and thus mechanically damps the transducers 26a to 26m. The damping signifies suppression of excessive oscillations of the transducers 26a to 26m. The matching layer 30 matches the acoustic impedance offered by the transducers 26a to 26m with the acoustic impedance offered by a subject so as to improve the efficiency in transmitting ultrasonic waves. The acoustic lens 32 concentrates an ultrasonic beam, which is transmitted or received by the transducers 26a to 26m, so as to reduce the beam width in a short-axis direction. The direction in which the transducers 26a to 26m are juxtaposed shall be regarded as a long-axis direction X and a direction orthogonal to the long-axis direction X shall be regarded as a short-axis direction Y. Supplementally, the long-axis direction X corresponds to a direction in which electrons are swept, and the short-axis direction Y corresponds to the longitudinal direction of the transducer 26a.

Figure 3:
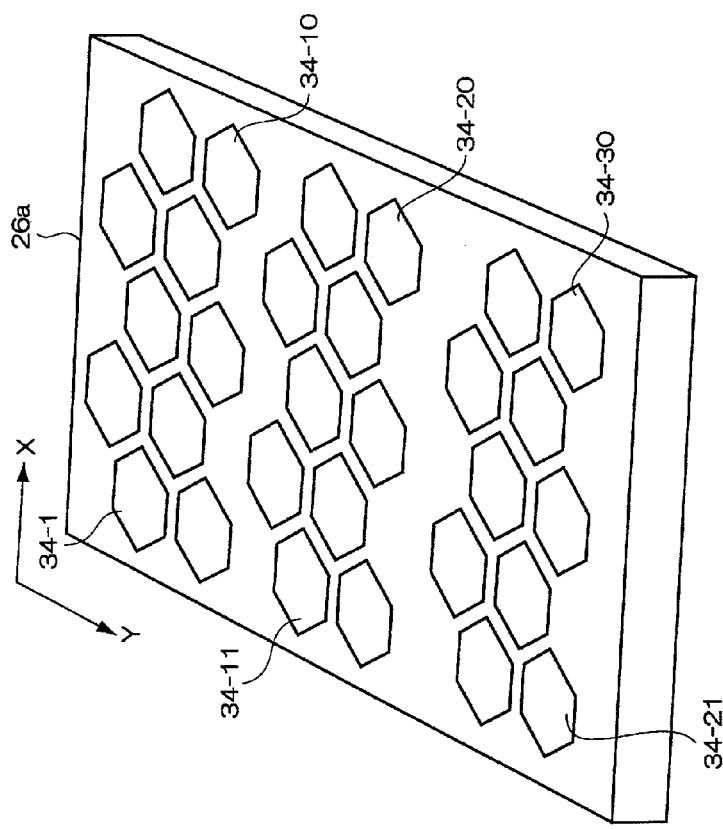
FIG. 3 is an enlarged perspective view of a transducer 26$a$ shown in FIG. 2.

FIG. 3 is an enlarged perspective view of the transducer 26a shown in FIG. 2. As shown in FIG. 3, the transducer 26a has, for example, multiple hexagonal oscillatory elements 34-1 to 34-30, formed therein. The oscillatory elements 34-1 to 34-30 are super-micromachined ultrasonic transducers of, for example, several micrometers in size. As the oscillatory elements 34-1 to 34-30, for example, a capacitive micromachined ultrasonic transducer (cMUT) (IEEE Trans. Ultrason. Ferroelect. Freq. Contr., Vol. 45, pp. 678-690, May, 1998 and the like) whose sensitivity to a transmitted or received ultrasonic wave, that is, whose electromechanical coupling coefficient varies depending on a bias voltage to be applied while being convoluted to a driving signal fed from the transmitting means 12 can be adopted. The cMUT is a super-microscopic capacitive ultrasonic transducer to be manufactured by performing a semiconductor microfabrication process (for example, low pressure chemical vapor deposition (LPCVD)). However, the present invention is not limited to the cMUT but any other type of super-micromachined ultrasonic transducer can be adopted. The oscillatory elements 34-1 to 34-30 are, as shown in FIG. 3, arranged equidistantly or with an unequal distance between adjoining ones in the long-axis direction X and short-axis direction Y. The same applies to the other transducers 26b to 26m. For convenience's sake, the number of oscillatory elements is reduced in the drawings. The present invention is not limited to the illustrated structure.

Figure 4:
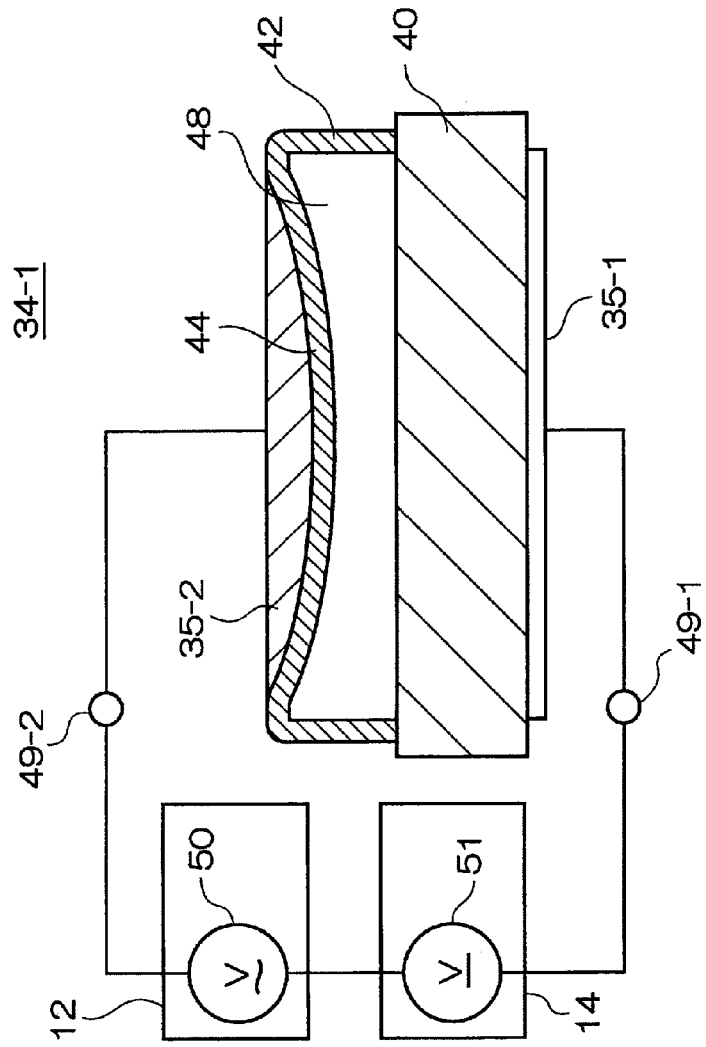
FIG. 4 is a longitudinal sectional view of an oscillatory element 34-1 shown in FIG. 3.

FIG. 4 is a longitudinal sectional view of an oscillatory element 34-1 shown in FIG. 3. As shown in FIG. 4, the oscillatory element 34-1 includes a silicon substrate 40, a cylindrical wall 42 formed on the silicon substrate 40, and a thin film 44 formed to block an apical opening of the wall 42. An internal space 48 is defined by the silicon substrate 40, wall 42, and thin film 44. The internal space 48 is retained in a vacuum of a predetermined degree or kept filled with a predetermined gas. Moreover, a common driving electrode 35-1 serving as an electrode is disposed on the back of the silicon substrate 40, and a driving electrode 35-2 is disposed on the top of the thin film 44. The common driving electrode 35-1 is connected to a driving signal power supply 50, which is included in the transmitting means 12, via a connecting terminal 49-1. The driving electrode 35-2 is connected to a dc bias power supply 51 included in a bias means 114 via a connecting terminal 49-2. In short, the oscillatory element 34-1 has a structure electrically resembling the structure of a capacitor.

Figure 5:
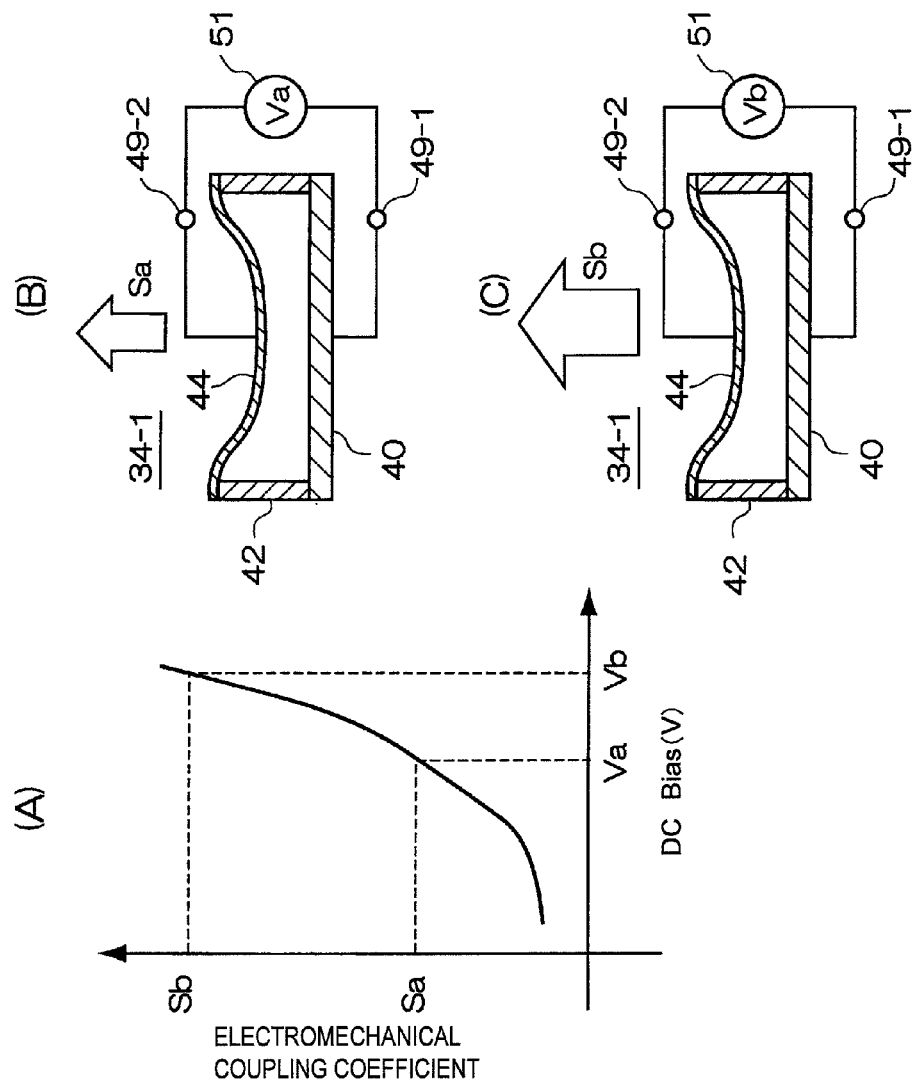
FIG. 5 is an explanatory diagram concerning the operation of the oscillatory element 34-1 shown in FIG. 4.

FIG. 5 is an explanatory diagram concerning the operation of the oscillatory element 34-1 shown in FIG. 4. For example, a dc bias Va is applied from the dc bias power supply 51 to the oscillatory element 34-1. The applied dc bias Va generates an electric field in the internal space 48 of the oscillatory element 34-1. The generated electric field tenses the thin film 44. Consequently, the electromechanical coupling coefficient of the oscillatory element 34-1 is set to a value Sa (FIG. 5A and FIG. 5B). When the driving signal power supply 50 supplies a driving signal to the oscillatory element 34-1, the fed driving signal is transformed into an ultrasonic wave according to the electromechanical coupling coefficient Sa. The driving signal is an electric signal having an ultrasonic frequency. When the oscillatory element 34-1 receives an ultrasonic wave returned from a subject, the thin film 44 of the oscillatory element 34-1 is excited based on the electromechanical coupling coefficient Sa. Consequently, the distance between the silicon substrate 40 and thin film 44 varies, and the capacity of the internal space 48 varies accordingly. The varied capacity is fetched as an electric signal.

On the other hand, when a dc bias Vb (Vb>Va) is applied to the oscillatory element 34-1 instead of the dc bias Va, the applied dc bias Vb causes the tension of the thin film 44 to vary. Consequently, the electromechanical coupling coefficient of the oscillatory element 34-1 is changed from the value Sa to a value Sb (Sb>Sa) (FIG. 5A and FIG. 5C). When a driving signal is fed from the driving signal power supply 50 to the oscillatory element 34-1, the fed driving signal is transformed into an ultrasonic wave according to the electromechanical coupling coefficient Sb. The same applies to the oscillatory elements 34-2 to 34-30.

The oscillatory elements 34-1 to 34-30 are designed to have a super-microscopic size (for example, several micrometers in size). In order to ensure an ultrasonic intensity that is large enough to produce a diagnostic image, the oscillatory elements 34-1 to 34-30 are grouped into multiple sets each including one oscillatory element or multiple adjoining oscillatory elements. Oscillatory elements (for example, the oscillatory elements 34-1 to 34-10) belonging to the same set are electrically interconnected. When a common dc bias and a common driving signal are applied to the oscillatory elements (for example, the oscillatory elements 34-1 to 34-10) belonging to the same set, the ultrasonic intensity that is large enough to realize actual diagnosis is ensured. The set is a unit that receives or transmits ultrasonic waves, for example, is equivalent to one transducer that has been termed in the past. Moreover, the set may be called an oscillatory element group.

The fundamental operations to be performed in the ultrasonic diagnostic apparatus having the foregoing configuration will be described below. To begin with, the ultrasonic wave transmitting/receiving surface of the probe 10 is brought into contact with, for example, the body surface of a subject. The transmitting means supplies a driving signal to the probe 10 in response to a command issued from the control means 21. Moreover, a dc bias is applied to the probe 10 while being convoluted to the driving signal. A transmitted-wave beam is emitted from the probe 10 according to the applied driving signal. The transmitted-wave beam has the width thereof narrowed at a focal point P. Echoes are reflected while ultrasonic waves are propagating through the subject. The reflected echoes are received by the probe 10, and thus transformed into received signals. The received signals sent from the probe 10 are amplified by the amplifying means 24. The amplified received signals are phased and summated by the phasing and adding means 25, whereby a received-wave beam is produced. The received-wave beam has the width thereof narrowed at the focal point P. Based on the received signal sent from the phasing and adding means 25, the image processing means 18 reconstructs an ultrasonic image (for example, a tomographic image). The reconstructed ultrasonic image is displayed on the display screen of the display means 20.

An ultrasonic image to be produced by the ultrasonic diagnostic apparatus has the image resolution thereof dominated by the width or diameter of an ultrasonic beam, which is transmitted or received by the probe 10, at the focal point P (which hereinafter may be referred to as a beam width). Operations to be performed in the ultrasonic diagnostic apparatus of the present embodiment in order to improve an azimuthal resolution by reducing a beam width will be described below.

Figure 6:
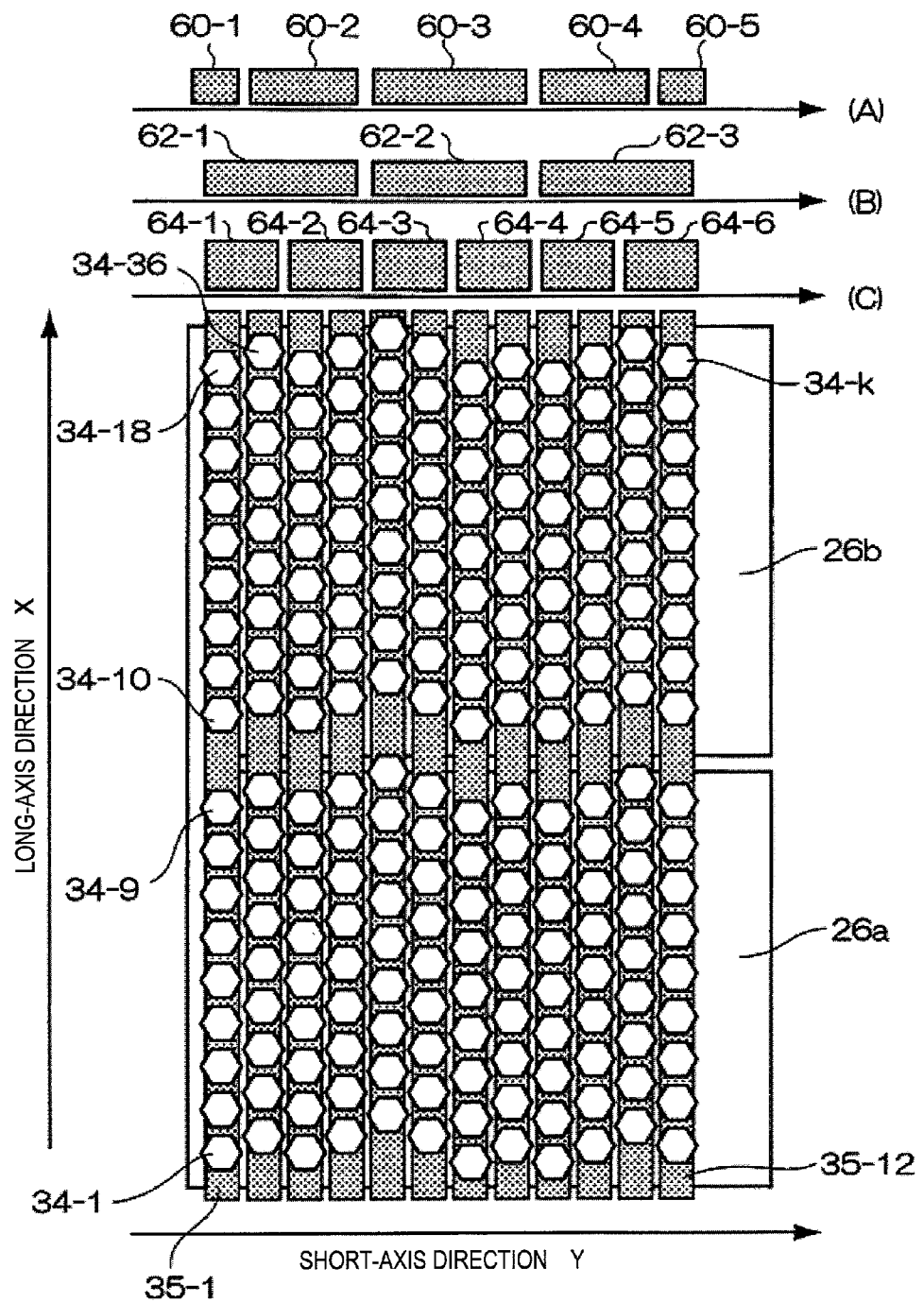
FIG. 6 includes explanatory diagrams showing forms of grouping in which multiple transducers are grouped into multiple sets in a short-axis direction.
Figure 7:
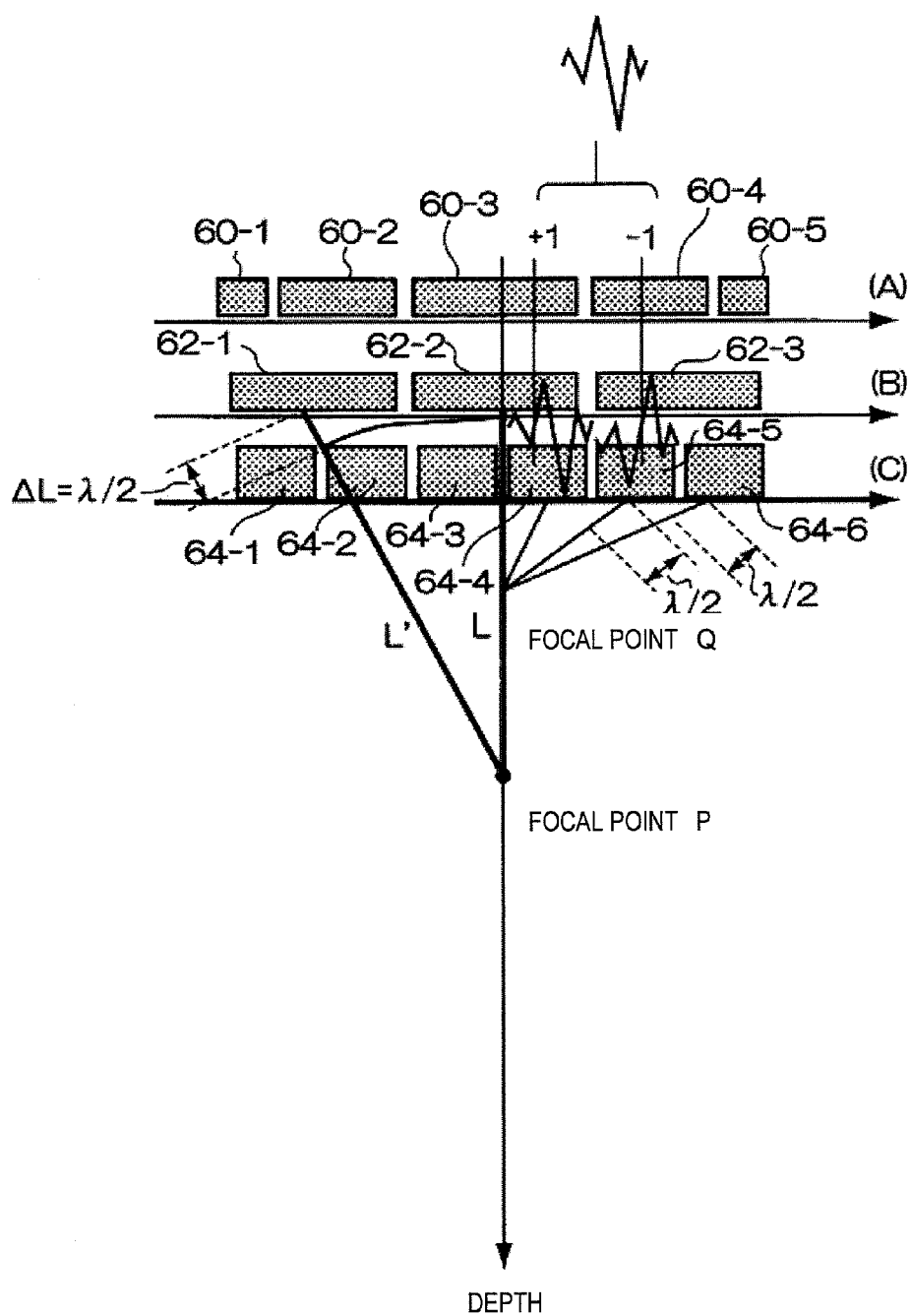
FIG. 7 includes explanatory diagrams concerning an idea of grouping multiple oscillatory elements into multiple sets.

FIG. 6 includes explanatory diagrams concerning the operation of the element selecting means 22, wherein multiple transducers are grouped into multiple sets in the short-axis direction. FIG. 7 is an explanatory diagram concerning an idea of grouping multiple oscillatory elements into multiple sets. In FIG. 6 and FIG. 7, the number of oscillatory elements and the number of sets are decreased for a better description. The present invention is not limited to the illustrated structure.

The upper part of FIG. 6 includes side views (FIG. 6A, FIG. 6B, and FIG. 6C) showing three forms of grouping in which oscillatory element groups are grouped into multiple sets, each of which includes one or multiple driving oscillatory elements, in the short-axis direction. The lower part of FIG. 6 is a front view showing the ultrasonic wave transmitting/receiving surfaces of the transducers 26a and 26b shown in FIG. 2.

As shown in the lower part of FIG. 6, the multiple oscillatory elements 34-1 to 34-k (where k denotes an integer equal to or larger than 2) are formed in the ultrasonic wave transmitting/receiving surfaces of the transducers 26a and 26b. More particularly, on the ultrasonic wave transmitting/receiving surfaces of the transducers 26a and 26b, multiple common driving electrodes 35-1 to 35-12 extending in the long-axis direction X are juxtaposed in the short-axis direction Y. The common driving electrodes 35-1 to 35-12 link adjoining transducers (for example, the transducer 26a and transducer 26b). The multiple oscillatory elements 34-1 to 34-k are arrayed and formed on the common driving electrodes 35-1 to 35-12 in the long-axis direction X. Among the oscillatory elements 34-1 to 34-18 arrayed on the common driving electrode 35-1, the oscillatory elements 34-1 to 34-9 are disposed at the position of the transducer 26a, and the oscillatory elements 34-10 to 34-18 are disposed at the position of the transducer 26b. On the common driving electrodes 35-2 to 35-12, oscillatory elements are arrayed basically in the same manner as the oscillatory elements on the common driving electrode 35-1.

The element selecting means 22 selects driving oscillatory elements, which transmit or receive ultrasonic waves from among the multiple oscillatory elements 34-1 to 34-k, and groups them into multiple sets. For example, as shown in FIG. 6A, the element selecting means 22 groups the multiple oscillatory elements 34-1 to 34-k into five sets 60-1 to 60-5 in the short-axis direction Y. The set 60-1 includes the oscillatory elements, which are disposed on the common driving electrode 35-1, as driving oscillatory elements belonging thereto, and serves as a unit to which a common driving signal of the same wave is applied. The set 60-2 includes the oscillatory elements, which are disposed on the common driving electrodes 35-2 to 35-4, as driving oscillatory elements belonging thereto. The set 60-3 includes the oscillatory elements, which are disposed on the common driving electrodes 35-5 to 35-8, as driving oscillatory elements belonging thereto. The set 60-4 includes the oscillatory elements, which are disposed on the common driving electrodes 35-9 to 35-11, as driving oscillatory elements belonging thereto. The set 60-5 includes the oscillatory elements, which are disposed on the common driving electrode 35-12, as driving oscillatory elements belonging thereto. In short, in the form of grouping shown in FIG. 6A, the oscillatory elements 34-1 to 34-k are grouped into multiple sets 60-1 to 60-5 in the short-axis direction so that the numbers of oscillatory elements belonging to the sets will decrease from the center of the aperture in the short-axis direction toward the ends thereof.

Moreover, as shown in FIG. 6B, the element selecting means 22 may group the multiple oscillatory elements 34-1 to 34-k into three sets 62-1 to 62-3 in the short-axis direction Y. The set 62-1 includes the oscillatory elements, which are disposed on the common driving electrodes 35-1 to 35-4, as driving oscillatory elements belonging thereto. The set 62-2 includes the oscillatory elements, which are disposed on the common driving electrodes 35-5 to 35-8, as driving oscillatory elements belonging thereto. The set 62-3 includes the oscillatory elements, which are disposed on the common driving electrodes 35-9 to 35-12, as driving oscillatory elements belonging thereto. In short, in the form of grouping shown in FIG. 6B, the oscillatory elements 34-1 to 34-k are grouped into the multiple sets 62-1 to 62-3 in the short-axis direction so that the numbers of oscillatory elements belonging to the respective sets 62-1 to 62-3 will be identical to one another. In FIG. 6B, the multiple common driving electrodes 35-1 to 35-12 are bundled in fours in the short-axis direction and thus grouped into the multiple sets 62-1 to 62-3. As shown in FIG. 6C, the multiple common driving electrodes 35-1 to 35-12 may be bundled in twos in the short-axis direction and thus grouped into multiple sets 64-1 to 64-6.

Next, an idea of grouping the oscillatory elements 34-1 to 34-k into multiple sets in any of the forms of grouping shown in FIG. 6 will be described with reference to FIG. 7. The upper part of FIG. 7 includes side views of oscillatory element groups and corresponds to the upper part of FIG. 6. The lower part of FIG. 7 shows a focal point P designated in a depth direction of a subject. Hereinafter, a description will be made by taking the form of grouping shown in FIG. 7B for instance. However, the same applies to the forms of grouping shown in FIG. 7A and FIG. 7C respectively.

The distance of the set 62-2, which is located in the center of the probe in the short-axis direction, to the focal point P is regarded as a reference distance L, and the distance of the set 62-1 or set 62-3 to the focal point P is regarded as a distance L'. The difference ΔL between the distance L' and the reference distance L is calculated. The three sets 62-1 to 62-3 and the numbers of driving oscillatory elements belonging to the sets 62-1 to 62-3 are determined so that the distance difference ΔL will fall within a permissible range designated based on the wavelength λ of ultrasonic waves. For example, the three sets 62-1 to 62-3 and the numbers of driving oscillatory elements belonging to the respective sets 62-1 to 62-3 are determined so that the distance difference ΔL will be squared with an integral multiple of a half (½) of the wavelength λ of ultrasonic waves. The sets 62-1 to 62-3 and the numbers of driving oscillatory elements belonging to the respective sets 62-1 to 62-3 are transmitted from the element selecting means 22 to each of the transmitting means 12 and bias means 14.

Specifically, the sets 62-1 to 62-3 and the numbers of driving oscillatory elements belonging to the respective sets 62-1 to 62-3 are determined based on the distance difference ΔL and the wavelength λ of ultrasonic waves, and the pitch between adjoining ones of the sets 62-1 to 62-3 is varied. The pitch between adjoining sets is the space between the center position of the set 62-1 and the center position of the set 62-2 or 62-3.

Based on the idea shown in FIG. 7, the element selecting means 22 groups the multiple oscillatory elements 34-1 to 34-k into multiple sets. The sets into which the oscillatory elements are grouped and the numbers of oscillatory elements belonging to the respective sets are transmitted as element selective command from the element selecting means 22 to each of, for example, the transmitting means 12 and bias means 14. The transmitting means 12 supplies a predetermined driving signal to the common driving electrodes 35-1 to 35-12 in response to an element selection command issued from the element selecting means 22. Likewise, the bias means 14 supplies a predetermined dc bias to the common driving electrodes 35-1 to 35-12 in response to the element selection command issued from the element selecting means 22. By changing a supplying destination of the driving signal or an application destination of the dc bias, the size (width) of each set can be varied and the pitch between adjoining sets can be varied. A description has been made with an emphasis put on focusing of a transmitted-wave beam sent from the probe 10. The same applies to focusing of a received-wave beam received by the probe 10. For focusing of the received-wave beam, the element selecting means 22 transmits the element selection command to each of the bias means 14 and phasing and adding means 25. Moreover, among the multiple oscillatory elements 34-1 to 34-k, the oscillatory elements to which the driving signal and dc bias are applied shall be called driving oscillatory elements, and the oscillatory elements to which the driving signal and dc bias are not applied shall be called non-active oscillatory elements.

As mentioned above, in the ultrasonic diagnostic apparatus of the present embodiment, the relationship between the pitch of adjoining sets and focus data is taken into consideration, and the pitch between adjoining sets is optimized based on the focal point P and the focus data. Specifically, according to the present embodiment, the number of sets and the numbers of driving oscillatory elements belonging to the respective sets are determined based on the distance difference ΔL and the wavelength λ of ultrasonic waves. Thus, the pitch between adjoining sets can be varied. In short, the distance of each set to the focal point P can be finely adjusted. Therefore, when the pitch between adjoining sets is varied so that the distance difference ΔL will fall within a permissible range, an incident that the difference ΔL between the distance of a driving oscillatory element to the focal point and the reference distance becomes different from the difference between the distance of an adjoining driving oscillatory element to the focal point and the reference distance can be avoided. Consequently, since only focus data associated with predetermined values of the distance difference ΔL should be prepared, an increase in the number of focus data can be suppressed. Moreover, when ultrasonic waves to be transmitted or received by the sets are controlled to lag on the basis of the focus data, the precision in matching the phases of ultrasonic waves improves. Eventually, a beam width can be further narrowed.

For example, the pitch between adjoining ones of the sets 62-1 to 62-3 is adjusted so that the distance difference ΔL shown in FIG. 7B will be squared with an integral multiple of a half (½) of the wavelength λ. In this case, a driving signal that is in phase with a reference wave is fed to the set 62-2, and an opposite-phase driving signal whose phase is turned by π with respect to the reference wave is fed to each of the set 62-1 and set 62-3. Namely, a common wave that is in phase with the reference wave is applied to the set 62-2 regarded as a unit, and a common wave that is in phase opposition to the reference wave is applied to each of the sets 62-1 and 62-3 that are regarded as a unit. Consequently, ultrasonic waves to be transmitted or received by the set 62-2 and ultrasonic waves to be transmitted or received by the sets 62-1 and 62-3 have the phases thereof matched at the focal point P. This results in an ultrasonic beam having a width thereof narrowed. Moreover, only data of +1 or −1 obtained based on the distance difference ΔL is needed as focus data. An increase in the number of focus data can be suppressed. The focus data of +1 is data needed to supply a driving signal that is in phase with the reference wave. The focus data of −1 is data needed to supply a driving signal that is in phase opposition to the reference wave.

In FIG. 7B, a beam width in the short-axis direction Y is narrowed at the focal point P. In FIG. 7C, the beam width in the short-axis direction Y is narrowed at a focal point Q whose depth is smaller than the depth of the focal point P.

FIG. 7B shows a form of grouping in which multiple oscillatory elements are broadly grouped into multiple sets, each of which includes multiple driving oscillatory elements, in order to concentrate ultrasonic waves on the focal point of a large depth. FIG. 7C shows a form of grouping in which oscillatory elements are finely grouped into multiple sets, each of which includes multiple driving oscillatory elements, in order to concentrate ultrasonic waves on the focal point of a small depth.

Specifically, when the depth of a focal point is large, adjoining sets are determined to have a large size. This is because when the focal point is deep, the difference between the distances of adjoining sets to the focal point gets smaller. For example, the difference between the distance of the set 62-1 to the focal point P and the distance of the set 62-2 to the focal point P is a half (½) of the wavelength λ. Moreover, the difference between the distances of the set 64-3 to the focal point Q and the distance of the set 64-2 to the focal point Q is a half (½) of the wavelength λ.

According to the present embodiment, as typically shown in FIG. 6 or FIG. 7, the phases of ultrasonic waves are matched among sets determined based on the position of the focal point P and the wavelength λ of the ultrasonic waves. Consequently, a beam width can be flexibly narrowed according to a change in the depth position of the focal point P.

COMPARATIVE EXAMPLE

Figure 8:
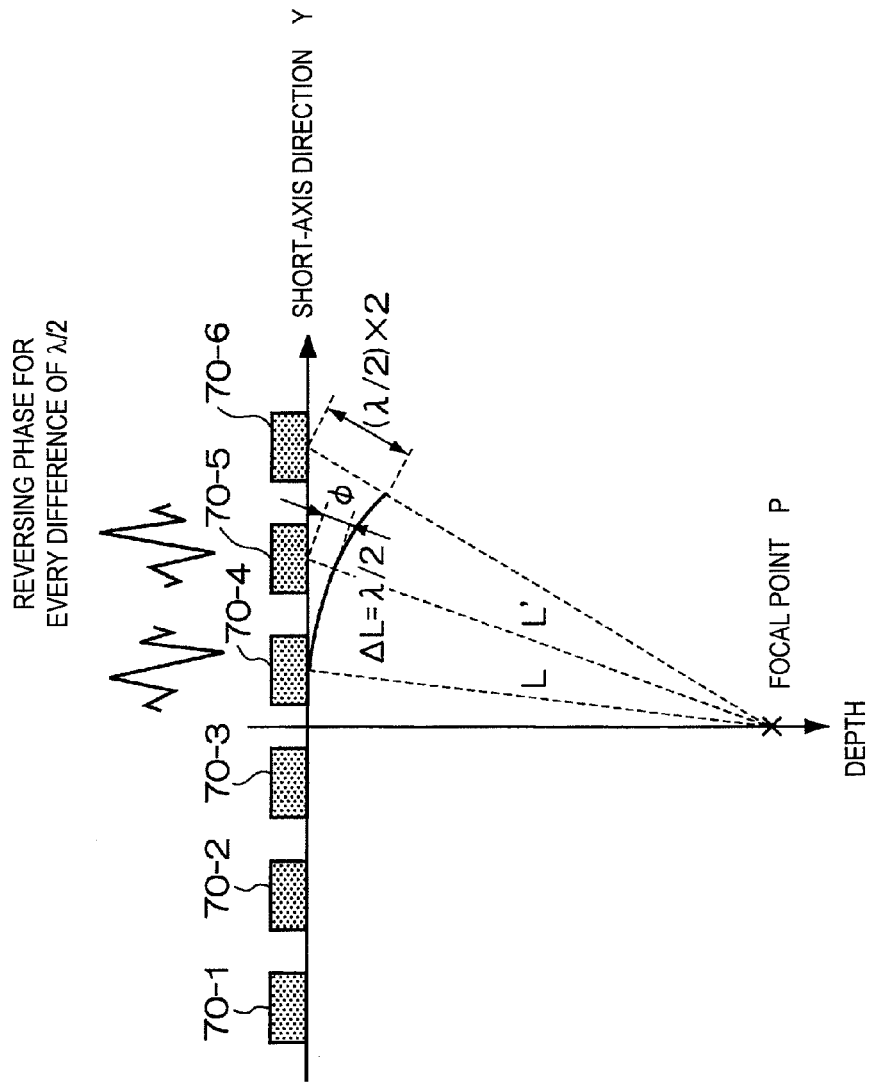
FIG. 8 shows a comparative form of grouping.

FIG. 8 shows an example to be compared with the present embodiment. As shown in FIG. 8, multiple oscillatory elements are grouped into multiple sets 70-1 to 70-6 in the short-axis direction. The pitch between adjoining ones of the sets 70-1 to 70-6 is fixed at an equal value. An ultrasonic beam is formed with ultrasonic waves to be transmitted or received by the sets 70-1 to 70-6. The ultrasonic beam is narrowed at the focal point P of a predetermined depth. In order to maximize the intensity of the ultrasonic beam at the focus point P, the phases of ultrasonic waves to be transmitted or received by the sets 70-1 to 70-6 should be matched at the focal point P. For example, assume that L denotes the distance of the set 70-4 to the focal point P and L' denotes the distance of the set 70-5 to the focal point P. In this case, the phase difference φ between ultrasonic waves to be transmitted from the set 70-4 and ultrasonic waves to be transmitted from the set 70-5 is expressed by an equation (1) below. In the equation (1), f denotes the frequency of ultrasonic waves, c denotes an acoustic velocity, and ΔL denotes the difference between the distance L and distance L'. Namely, the equation (1) converts the distance difference ΔL into the phase difference φ.

$$\phi = 2\pi f \Delta L / c \qquad (1)$$

In consideration of the phase difference φ provided by the equation (1), the timing of transmitting ultrasonic waves from the set 70-4 is differentiated from the timing of transmitting ultrasonic waves from the set 70-5. Consequently, the ultrasonic waves are summated at the focal point P while being in phase with one another, and the intensity of a transmitted-wave beam is increased at the focal point P. Even for a received-wave beam, based on the same idea, the phasing and adding means 25 phases the ultrasonic waves received by the set 70-4 and the ultrasonic waves received by the set 70-5 in consideration of the phase difference φ.

Herein, since the pitch between adjoining sets represented by the set 70-4 and set 70-5 is fixed at a certain value, the distance difference ΔL varies depending on the position of the focal point P. Consequently, the phase difference φ varies along with the variation in the distance difference ΔL. From this viewpoint, a method of preparing multiple focus data in compliance with the variation in the phase difference φ derived with the change in the focal point P is conceivable. However, according to this method, the number of focus data becomes enormous. Consequently, a memory capacity needed to preserve the focus data increases, and a circuit scale increases. In order to suppress the increase in the number of focus data, a method described below has been put to trail. Specifically, as long as the distance difference ΔL falls, for example, within a range equal to or smaller than λ/2 (where λ denotes the wavelength of ultrasonic waves), the first focus data is used to handle ultrasonic waves that are in phase with one another. Every time the distance difference ΔL exceeds λ/2, the second focus data is used to turn the phase of ultrasonic waves by π so that all ultrasonic waves will be finally phased. Namely, in this method, the distance difference ΔL is rated in units of λ/2 so as to restrict the number of focus data to, for example, two.

A method of rating the distance difference ΔL in units of λ/2 will be supplemented below. The phase difference between ultrasonic waves to be transmitted or received by the set 70-4 and ultrasonic waves to be transmitted or received by the set 70-5 is expressed by an equation (2) below on the basis of the equation (1). The sign function of the equation (2) is a signum function that provides a value of +1 or −1.

$$S = \text{sign}[\text{mod}(\phi, 2\pi) - \pi] \qquad (2)$$

The equation (2) has the meaning described below. Namely, when the phase difference φ satisfies the condition of 0≦φ<π, the ultrasonic waves to be transmitted or received by the set 70-4 and the ultrasonic waves to be transmitted or received by the set 70-5 are handled while being in phase with each other. On the other hand, when the phase difference φ satisfies the condition of π≦φ<2π, the ultrasonic waves to be transmitted or received by the set 70-4 and the ultrasonic waves to be transmitted or received by the set 70-5 are handled while being antiphase with each other. In short, when the distance difference ΔL between adjoining sets is equal to or smaller than a half wavelength, the ultrasonic waves to be transmitted or received by the sets are in phase with each other. When the distance difference ΔL exceeds a half (½) of the wavelength λ of ultrasonic waves, the ultrasonic waves to be transmitted or received by the sets are in phase opposition to each other, that is, are phased with the amplitudes thereof made opposite to each other. Incidentally, a description has been made by taking the ultrasonic waves to be transmitted or received by the set 70-4 and the ultrasonic waves to be transmitted or received by the set 70-5 for instance. The same applies to the other sets.

According to the comparative example, focus data needed to phase ultrasonic waves to be transmitted or received by the sets 70-1 to 70-6 is data of +1 or −1 to be obtained from the distance difference ΔL. Consequently, the number of focus data is smaller than that needed in the method of preparing multiple focus data for coping with the variation in the distance difference ΔL.

However, in the comparative example, a phase mismatch of ultrasonic waves may be derived from so-called rounding or rounding down of a minute phase difference. Once the phase mismatch occurs, a beam width gets relatively large. An ultrasonic beam including an unnecessary response component is produced. In the comparative example, an error does not occur in phase matching only when the phase difference φ squares with π.

In contrast with the comparative example, in the present embodiment described with reference to FIG. 1 to FIG. 7, instead of rating the distance difference ΔL in units of λ/2, the number of sets and the numbers of driving oscillatory elements belonging to the sets are determined based on the depth position of the focal point P and the wavelength λ of ultrasonic waves, and the pitch between adjoining sets is variable. Consequently, the distance of each set to the focal point P can be finely adjusted. Therefore, focus data representing predetermined values of the distance difference ΔL should merely be prepared. Consequently, an increase in the number of focus data can be suppressed, and a memory capacity for the focus data can be reduced. Moreover, when ultrasonic waves to be transmitted or received by each set are controlled to lag on the basis of the focus data, the precision in phase matching of ultrasonic waves improves. Eventually, a beam width can be further narrowed.

The present invention has been described by taking the embodiment for instance. However, the invention is not limited to the embodiment. For example, although the forms of grouping shown in FIG. 6 and FIG. 7 have been described with an emphasis put on narrowing of a beam width in the short-axis direction Y, a beam width in the long-axis direction X may be narrowed. For this purpose, the number of sets into which multiple oscillatory elements 34-1 to 34-k are grouped in the long-axis direction and the numbers of driving oscillatory elements belonging to the sets may be determined based on the position of the focal point P or the wavelength λ of ultrasonic waves. Incidentally, when dynamic focus based on digital phasing is applied to each of transducers 26a, 26b, etc. arranged in the long-axis direction, the dynamic focus technique may be used together to narrow the beam width in the long-axis direction.

In relation to the forms of grouping shown in FIG. 6 and FIG. 7, a description has been made of optimization of a pitch between adjoining sets on the basis of the position of the focal point P and focus data. Alternatively, focus data may be optimized based on the position of the focal point P and the pitch between adjoining sets. What is referred to as optimization of focus data is that focus data is designed so that the phases of ultrasonic waves to be transmitted or received by sets will be matched at the focal point P for the purpose of further narrowing the beam width to be attained at the focal point P.

Figure 9:
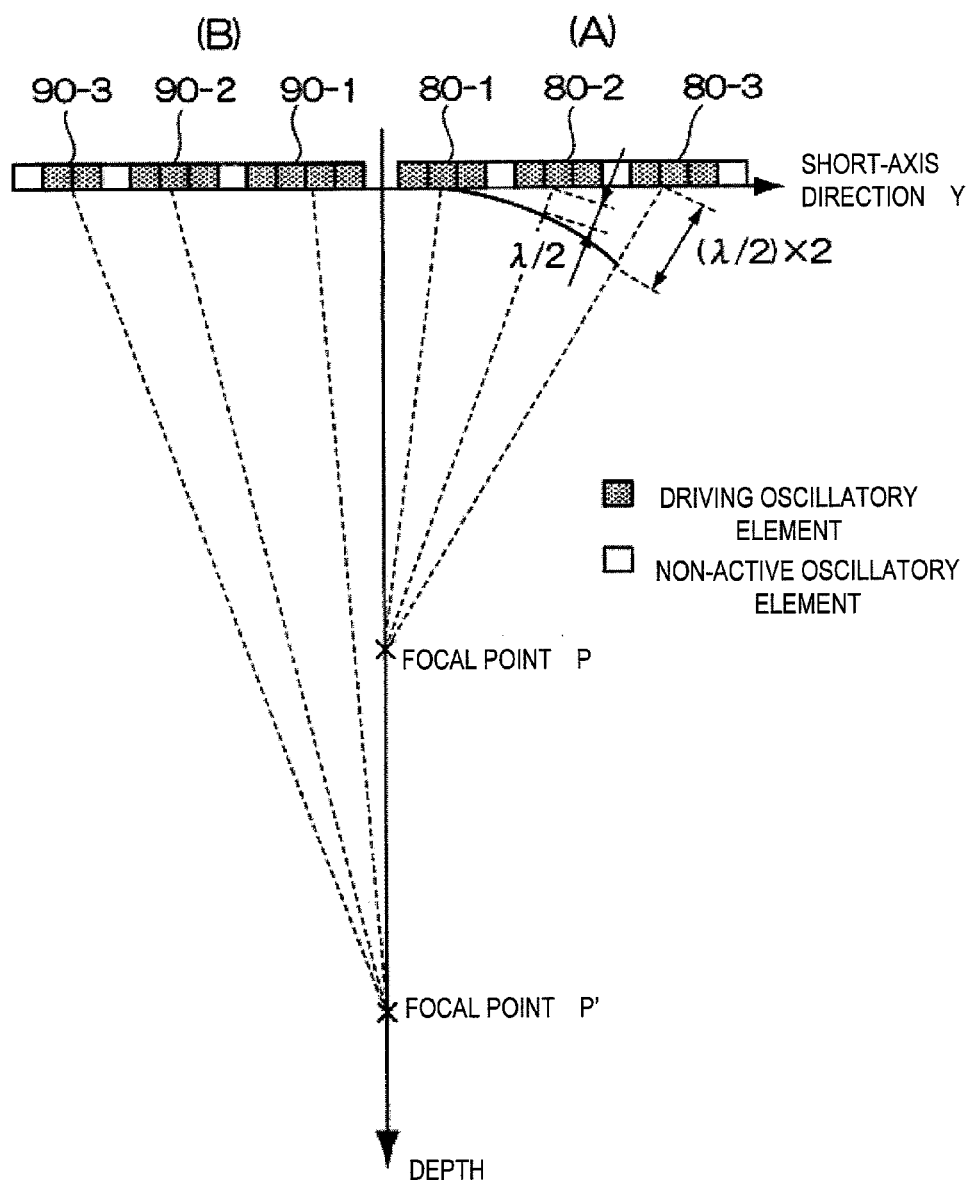
FIG. 9 is an explanatory diagram showing another form of grouping in which multiple transducers are grouped into multiple sets in the short-axis direction.

FIG. 9 is an explanatory diagram showing other forms of grouping in which multiple transducers are grouped into multiple sets in the short-axis direction. In FIG. 9A, multiple oscillatory elements are grouped into multiple sets 80-1 to 80-3 each including one or multiple adjoining driving oscillatory elements, and the pitch between adjoining ones of the sets 80-1 to 80-3 is equal. In FIG. 9B, oscillatory elements are grouped into multiple sets 90-1 to 90-3 each including one or multiple adjoining driving oscillatory elements, and the pitch between adjoining ones of the sets 90-1 to 90-3 is unequal. What is referred to as the pitch is the space between the center position of one set and the center position of an adjoining set. In either of the forms of grouping shown in FIG. 9A and FIG. 9B, driving oscillatory elements (active elements) and non-active oscillatory elements (non-active elements) are selected from among multiple oscillatory elements in order to adjust the pitch between adjoining sets. What are referred to as the non-active oscillatory elements are oscillatory elements to which a driving signal is not fed from the transmitting means 12 in response to a command issued from the element selecting means 22 or oscillatory elements to which a dc bias is not applied from the bias means 14. The pitch between adjoining sets can be finely adjusted by regulating the number of non-active oscillatory elements to be selected. Moreover, by selecting the non-active oscillatory elements, a crosstalk of ultrasonic waves occurring between sets can be minimized.

In the form of grouping shown in FIG. 9B, multiple oscillatory elements are grouped into multiple sets 90-1 to 90-3 in the short-axis direction so that the numbers of oscillatory elements belonging to the sets will get smaller from the center of the aperture in the short-axis direction to the ends thereof. Consequently, the intensity of ultrasonic waves to be transmitted or received by a set located in the center becomes the largest, while the intensity of ultrasonic waves to be transmitted or received by sets located at the ends of the aperture becomes the smallest. Namely, an ultrasonic beam can be shaped sharply according to the depth position of the focal point P or P'. Consequently, an azimuthal resolution to be attained with an ultrasonic beam converged at the focal point P or P' can be improved and an image resolution can be improved.

Moreover, the present embodiment has been described with an emphasis put on focusing to be performed when ultrasonic waves are transmitted from the ultrasonic probe 10 in order to form a transmitted-wave beam. The same applies to focusing to be performed when the probe 10 receives ultrasonic waves and the phasing and adding means 25 forms a received-wave beam.

Moreover, in the forms of grouping shown in FIG. 7, the pitch between adjoining sets is adjusted in order to square the distance difference ΔL with an integral multiple of a half (½) of the wavelength λ of ultrasonic waves. As focus data, two data such as data causing ultrasonic waves to be in phase with a reference wave and data causing the ultrasonic waves to be in phase opposition to the reference wave have been described to be prepared. However, the present invention is not limited to the two data. For example, the pitch between adjoining sets may be adjusted so that the distance difference ΔL will be squared with an integral multiple of a quarter (¼) of the wavelength λ of ultrasonic waves. In this case, four data, that is, data causing the ultrasonic waves to be in phase with the reference wave, data needed to turn the phases of the ultrasonic waves by π/2 with respect to the reference wave, data needed to turn the phases of the ultrasonic waves by π with respect to the reference wave, and data needed to turn the phases of the ultrasonic waves by 3π/2 with respect to the reference wave should be prepared as focus data. Even in these cases, compared with a case where numerous focus data are prepared in association with various values of the distance difference ΔL, the number of focus data can be suppressed and a beam width can be narrowed. Based on the same idea, the pitch between adjoining sets may be adjusted so that the distance difference ΔL will be squared with λ/6 or λ/8. In short, the distance difference ΔL dependent on the depth position of the focal point P is restricted to one predetermined value or multiple predetermined values. The phases of ultrasonic waves to be transmitted or received by sets are turned based on the predetermined values of the distance difference ΔL. Consequently, the phases of ultrasonic waves can be matched at the focal point P.

Moreover, the phases of the ultrasonic waves may be turned by n·π/2 with respect to a reference wave. Herein, n denotes a natural number. The control means 21 regulates n, whereby an increase in the number of focus data can be suppressed.

The relationship between the pitch between adjoining sets and focus data has been defined based on the distance of the center point of each set to a focal point P. The present invention is not limited to the definition. For example, the relationship may be defined based on the distance of the outermost point of each set, which is symmetric with respect to the center thereof, to the focal point P. In short, focus data may be determined based on the distance from any predefined point of each set to the focal point P.

Figure 10:
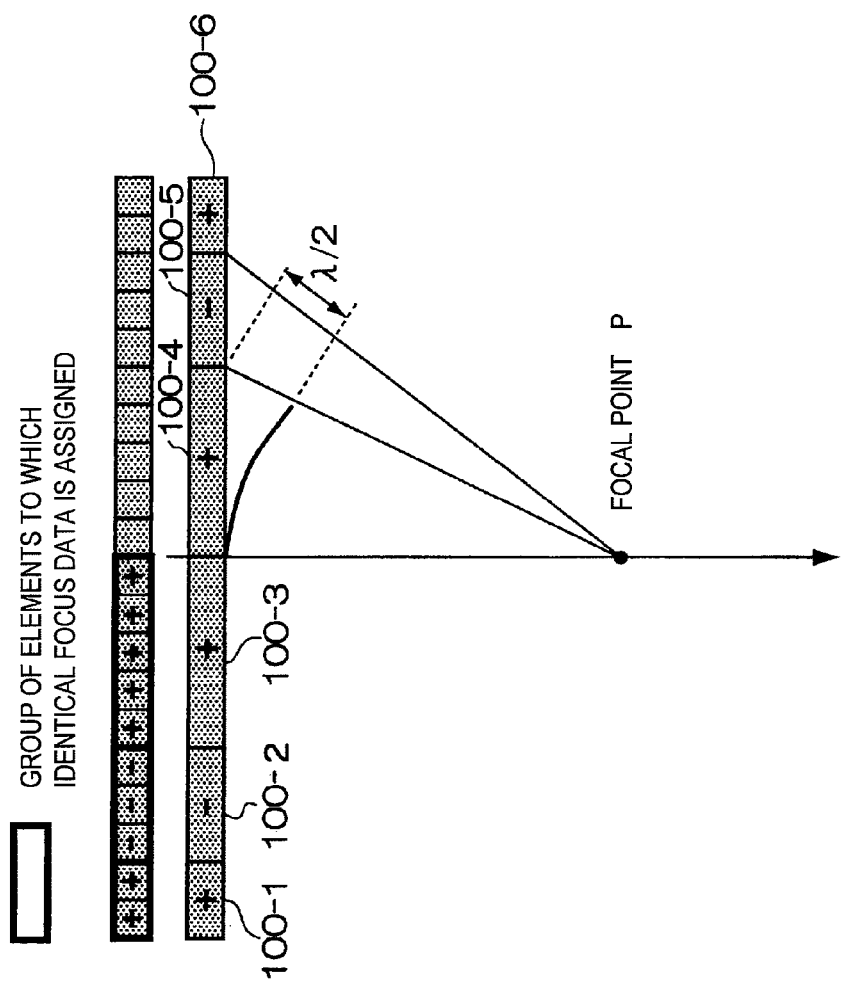
FIG. 10 shows an example in which a distance difference ΔL is determined based on the distance from the outermost point of each set to a focal point P.

FIG. 10 shows an example in which the distance difference ΔL is determined based on the distance from the outermost point of each set to the focal point P. In the upper part of FIG. 10, multiple oscillatory elements each of which is the smallest transducer unit are arrayed. In the lower part of FIG. 10, oscillatory element groups are divided into multiple sets 100-1 to 100-6 so that the numbers of oscillatory elements belonging to the sets will decrease from the center of the aperture to the ends thereof. For convenience's sake, the oscillatory elements are divided into six sets. The number of sets and the numbers of oscillatory elements belonging to the sets can be altered appropriately. As shown in FIG. 10, when the distance from the center position to the focal point P is regarded as a reference distance, focus data of +1 is assigned to oscillatory elements whose distances to the focal point P are larger than the reference distance by $(\lambda/2) \times n$ (where n denotes 1, 2, or the like). Focus data of −1 is assigned to oscillatory elements whose distances to the focal point P is larger than the reference distance by more than $(\lambda/2)$. When the smallest transducer unit, that is, an oscillatory element is not classified into either of the above categories, an ideal oscillatory element which an oscillatory element occupies at a high area occupancy is selected. However, the present invention is not limited to this mode.

Figure 11:
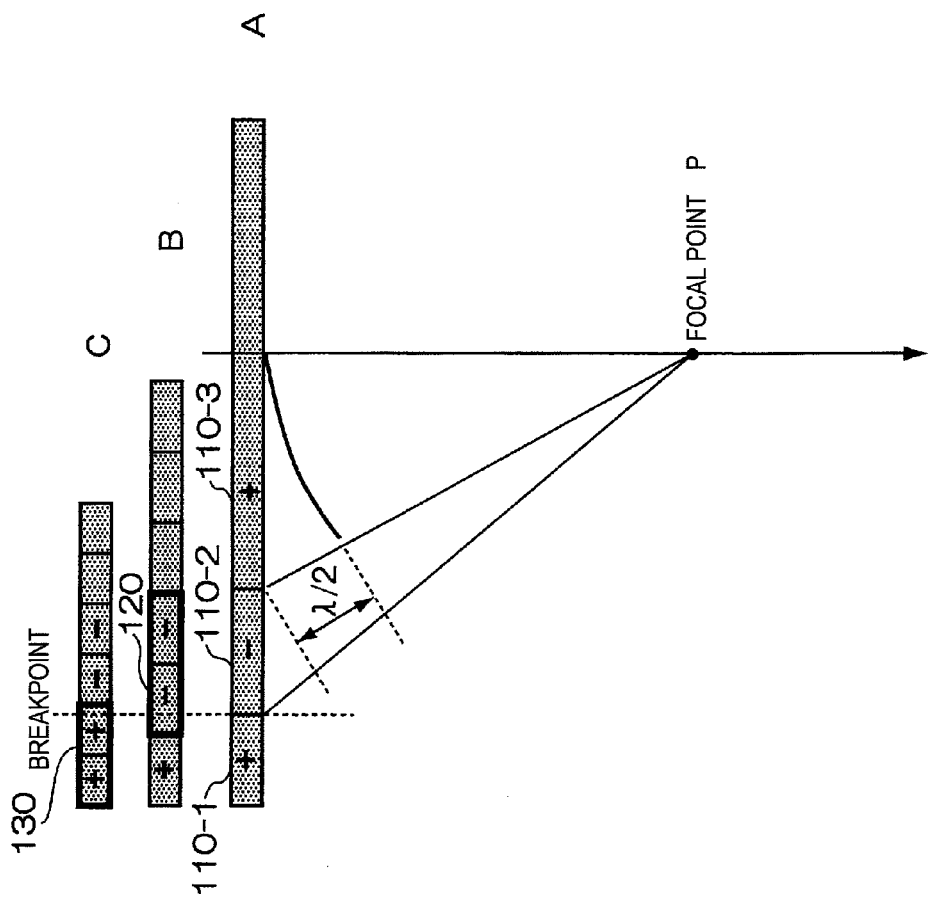
FIG. 11 shows forms of grouping in which focus data is determined based on an area occupancy of a group located at a breakpoint that is a border between ideal sets.

FIG. 11 shows form of groupings in which focus data is determined based on the area occupancy at which a set located on a border of a breakpoint of an ideal set occupies the ideal set. FIG. 11A shows ideal sets 110-1 to 110-3 whose distances to the focal point P vary in units of $\lambda/2$ all the time. The border between ideal sets shown in FIG. 11A shall be referred to as a breakpoint. FIG. 11B and FIG. 11C show examples in which oscillatory elements are grouped into arbitrary sets of different sizes. Herein, each set include one or multiple oscillator elements.

As shown in FIG. 11B, a set 120 that is the second outermost set from the end of the aperture is located across a breakpoint. In this case, the area of the set 120 corresponding to the set 110-2 shown in FIG. 11A is larger than the area thereof corresponding to the set 110-1. Namely, the area occupancy at which the set 120 occupies the area of the set 110-2 is higher. Consequently, focus data of −1 is assigned to the set 120. In contrast, as shown in FIG. 11C, the area of a set 130, which is the second outermost set from the end of the aperture, corresponding to the set 110-1 shown in FIG. 11A is larger than the area thereof corresponding to the set 110-2. Consequently, focus data of +1 is assigned to the set 130. Thus, even when a set is located across a breakpoint, focus data to be assigned to the set can be appropriately determined.

In the foregoing embodiment, multiple driving oscillatory elements are grouped into multiple sets each including one or multiple adjoining driving oscillatory elements. The distance of a set located in the center to the focal point P is regarded as the reference distance L. The difference ΔL between the distance L' of any other set to the focal point P and the reference distance L is calculated. The pitch between adjoining sets is varied so that the distance difference ΔL will meet a condition of, for example, $\Delta L = (\lambda/2) \times n$ (where n denotes a natural number). A driving signal that is in phase with a reference wave is fed to the set located in the center, and a driving signal that is in phase opposition to the reference wave is fed to an adjoining set. Consequently, ultrasonic waves to be transmitted or received by sets have the phases thereof matched at the focal point P. Since the ultrasonic waves are mutually intensified, the width of an ultrasonic beam to be transmitted or received by the probe 10 is narrowed at the focal point P. Eventually, an ultrasonic beam having an unnecessary response component thereof minimized can be formed, and an image resolution can be improved.

The control means 21 may include a synthesizing means. The synthesizing means controls the phases of ultrasonic waves in units of a set so as to form an ultrasonic beam having a first focus and an ultrasonic beam having a second focus whose depth is larger than the depth of the first focus. The synthesizing means joins a signal, which expresses a shallow region of a subject and is a component of a signal received in return for the first ultrasonic beam, with a signal, which expresses a deep region thereof and is a component of a signal received in return for the second ultrasonic beam, so as to produce ultrasonic image data. Since an ultrasonic beam can be transmitted or received alternately to or from the focal point P or the focal point Q whose depth is smaller than the depth of the focal point P, like a multi-focal system. Ultrasonic images expressing regions of multiple depths can be nearly simultaneously produced.

(Second Embodiment)

Figure 12:
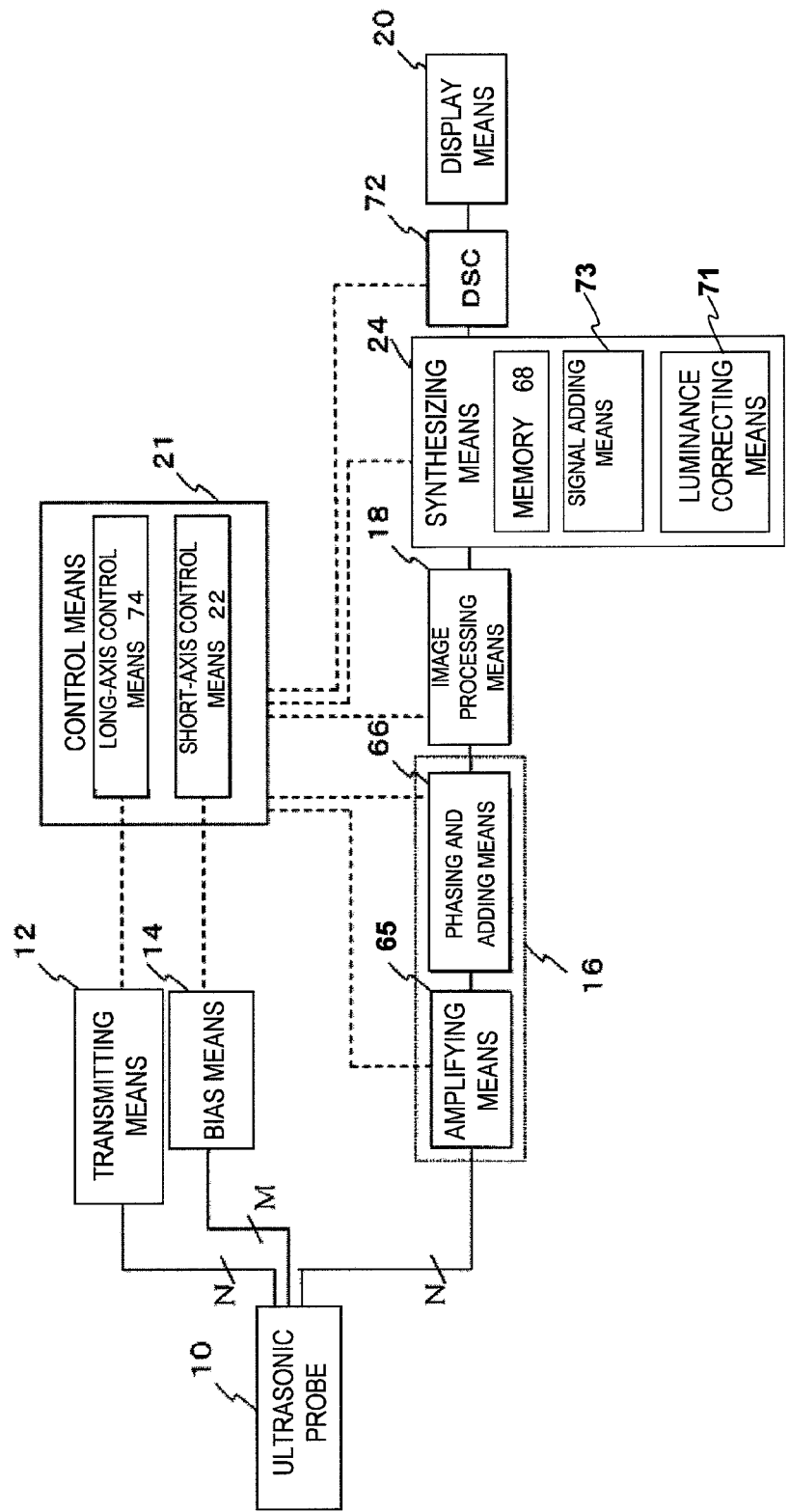
FIG. 12 is a block diagram showing the configuration of an ultrasonic diagnostic apparatus in accordance with the second embodiment of the present invention.

The second embodiment of an ultrasonic diagnostic apparatus to which the present invention is applied will be described with reference to drawings. The present embodiment is an example for improving the quality of ultrasonic images by improving an azimuthal resolution in a short-axis direction offered by an ultrasonic beam. FIG. 12 is a block diagram showing the configuration of an ultrasonic diagnostic apparatus in accordance with the present embodiment.

As shown in FIG. 12, an ultrasonic diagnostic apparatus includes an ultrasonic probe 10 (hereinafter a probe 10) that transmits or receives ultrasonic waves to or from a subject, a transmitting means 12 for supplying a driving signal to the probe 10, a bias means 14 for applying a dc bias to the electrodes of multiple oscillatory elements arrayed in the probe 10, a receiving means 16 for handling a received signal sent from the probe 10, an image processing means 18 for reconstructing an ultrasonic image (for example, a tomographic image or a blood flow image) on the basis of a signal sent from the receiving means 16, and a display means 20 on which an ultrasonic image is displayed.

Moreover, a control means 21 is included for transmitting a command to each of the transmitting means 12, bias means 14, receiving means 16, image processing means 18, and display means 20.

The ultrasonic probe 10 to be adapted to the ultrasonograph in accordance with the present embodiment has multiple oscillatory elements, which transform ultrasonic waves to electric signals or vice versa, arrayed rectangularly, has opposite electrodes grouped in a short-axis direction orthogonal to the axis of the rectangular array, and has an acoustic lens disposed on an ultrasonic-wave transmitting/receiving side thereof. In the ultrasonic diagnostic apparatus, a short-axis control means 22 serving as a focus control means is included in the control means 21, and a synthesizing means 24 is included as a stage succeeding the image processing means 18. The short-axis control means 22 has the ability to group the opposite electrodes, which are grouped in the short-axis direction, into multiple sets and to control the phases of ultrasonic waves in units of a set so as to form an ultrasonic beam having a first focus. Moreover, the short-axis control means 22 has the ability to form an ultrasonic beam, which has a second focus whose depth is larger than the depth of the first focus, using the acoustic lens. The synthesizing means 24 joins a signal, which expresses a shallow region of a subject and is a component of a signal received in return for the first ultrasonic beam, with a signal, which expresses a deep region of the subject and is a component of a signal received in return for the second ultrasonic beam, so as to produce ultrasonic image data. Herein, the short-axis control means 22 is included in the control means 21, but may be included in any other means.

Figure 13:
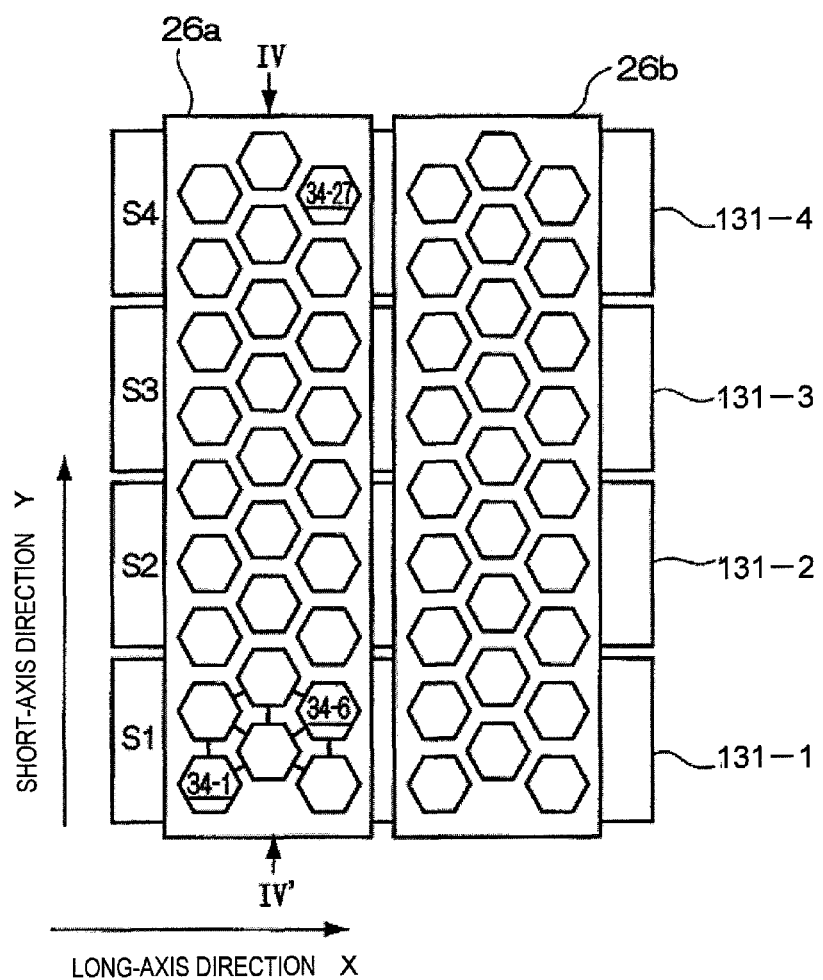
FIG. 13 shows the structure of an ultrasonic probe shown in FIG. 12.

The ultrasonic diagnostic apparatus will be described in more detail. To begin with, the probe 10 adapted to the ultrasonic diagnostic apparatus will be described. FIG. 13 shows the structure of the probe 10 shown in FIG. 12.

The probe 10 is designed to be of a one-dimensional array type having multiple transducers 26a to 26N (where N denotes an integer equal to or larger than 2) arrayed rectangularly. However, the present invention can be applied to a two-dimensional array type having the transducers 26a to 26N arrayed two-dimensionally or a convex type having the transducers 26a to 26N arrayed in the form of a sector. The transducers 26a to 26N each have multiple oscillatory elements formed therein. The oscillatory elements each transform a drive signal fed from the transmitting means 12 to an ultrasonic wave, and transmit the ultrasonic wave to a subject. Moreover, the oscillatory elements each receive an ultrasonic wave returned from the subject, transform it to an electric signal. Incidentally, a matching layer, an acoustic lens, and a backing material are as described in conjunction with FIG. 2.

As shown in FIG. 13, the transducer 26a has multiple hexagonal oscillatory elements 34-1 to 34-27 formed on an ultrasonic-wave transmitting/receiving surface thereof. The oscillatory elements 34-1 to 34-27 are, for example, super-micromachined ultrasonic transducers of, for example, several micrometers in diameter. Moreover, ultrasonic transducers made of a material containing an electro-striction material may be substituted for the capacitive micromachined ultrasonic transducers (cMUTs). In short, an element whose electromechanical coupling coefficient Kt varies depending on the magnitude of an applied bias and which can reverse the amplitude of an ultrasonic wave to be transmitted or received when the polarity of a dc bias is reversed is adopted as the oscillatory elements.

The multiple oscillatory elements 34-1 to 34-27 are arrayed in a short-axis direction Y and a long-axis direction X. The oscillatory elements 34-1 to 34-27 should be arrayed at least in the short-axis direction Y. In the long-axis direction X, a long-axis control means 74 performs so-called focus control for each of the transducers 26a to 26N.

Moreover, multiple short-axis common electrodes serving as lower opposite electrodes are formed on the backs of the oscillatory elements 34-1 to 34-27 respectively. The lower short-axis common electrodes are grouped into multiple lower short-axis common electrode blocks 131-1 to 131-4 in the short-axis direction Y. Namely, the lower short-axis common electrode blocks 131-1 to 131-4 are extended in the long-axis direction and juxtaposed in the short-axis direction. More particularly, the lower short-axis common electrode blocks 131-1 to 131-4 are arranged in association with sets each including one oscillatory element or multiple adjoining oscillatory elements. For example, the lower short-axis common electrode block 131-1 is connected as a common electrode to each of the oscillatory elements 34-1 to 34-6. Upper-electrode long-axis element electrodes are connected to the respective transducers 26a and 26b. For example, the upper long-axis element electrode is formed on the ultrasonic-wave transmitting/receiving surface of the transducer 26a (including the oscillatory elements 34-1 to 34-27).

Figure 14:
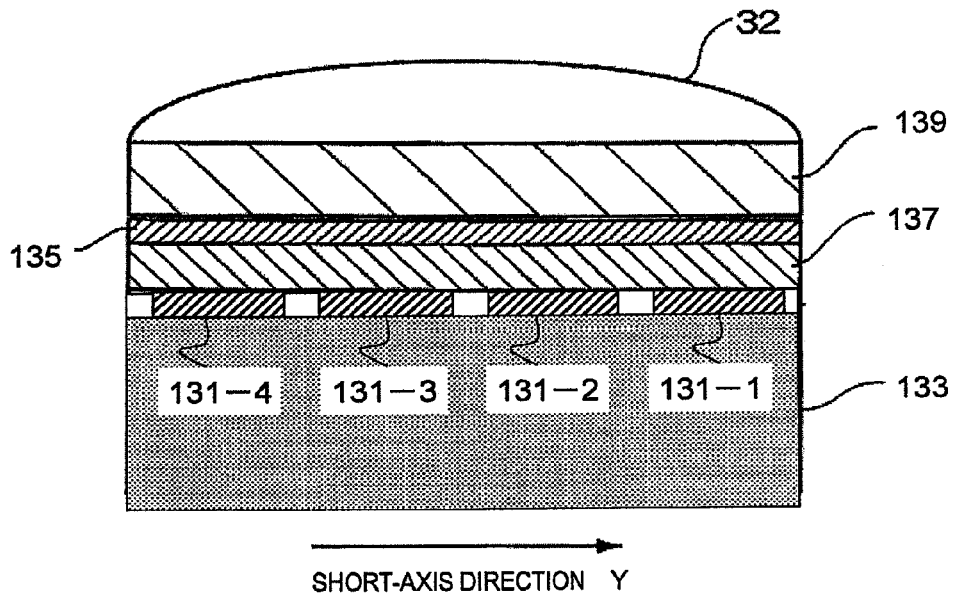
FIG. 14 is a front view of an ultrasonic-wave transmitting/receiving surface of a transducer shown in FIG. 12.

FIG. 14 is a sectional view of an IV-IV' plane shown in FIG. 13 in which a structure including the electrodes of the transducers 26a and 26b is shown. As shown in FIG. 14, the multiple lower short-axis common electrode blocks 131-1 to 131-4 are formed on the backs of the transducers 26a and 26b. The lower short-axis common electrode blocks 131-1 to 131-4 are extended in the long-axis direction and juxtaposed in the short-axis direction. More particularly, the lower short-axis common electrode blocks 131-1 to 131-4 are arranged in association with sets each including one oscillatory element or adjoining oscillatory elements. For example, as shown in FIG. 14, the lower short-axis common electrode block 131-1 is connected as a common electrode to each of the oscillatory elements 34-1 to 34-6. A semiconductor substrate 133 is layered on the backs of the lower short-axis common electrode blocks 131-1 to 131-4.

Upper long-axis element electrodes 135 are formed on the ultrasonic-wave transmitting/receiving surfaces of the transducers 26a and 26b. More particularly, the multiple upper long-axis element electrodes 135 are extended in the short-axis direction and juxtaposed in the long-axis direction. For example, as shown in FIG. 14, the upper long-axis element electrode 135 is formed on the ultrasonic-wave transmitting/receiving surface of the transducer 26a. A space 137 serving as a sensor is interposed between the upper long-axis element electrode 135 and the transducer 26a. Moreover, an upper film 139 is formed on the subject-side surfaces of the upper long-axis element electrodes 135. The upper film 139 oscillates responsively to a driving signal fed to the upper long-axis element electrode 135 or echoes reflected from a subject.

Figure 15:
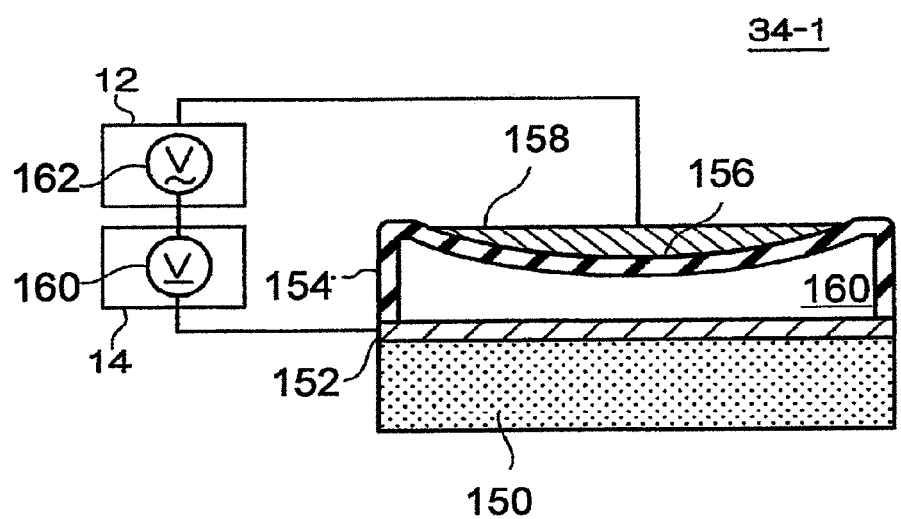
FIG. 15 is an illustrative view showing the structure of an electrode included in the transducer shown in FIG. 12.

FIG. 15 is an illustrative view showing a longitudinal section of a capacitive micromachined ultrasonic transducer (cMUT) adopted as an oscillatory element 34-1 shown in FIG. 13 or FIG. 14. As shown in FIG. 15, the oscillatory element 34-1 is a microscopic (for example, several micrometers in diameter) ultrasonic transducer fabricated at a semiconductor processing step. As shown in FIG. 15, the oscillatory element 34-1 includes a silicon substrate 150, a lower electrode 152 formed on the top of the silicon substrate 150, a cylindrical wall 154 formed on the top of the lower electrode 152, a thin film 156 formed over an apical opening of the wall 154, and an upper electrode 158 formed on the ultrasonic-wave emitting surface of the thin film 156. The thin film 156 is made of a silicon compound or the like. Moreover, the silicon substrate 150, wall 154, and thin film 156 define an internal space 160. The internal space 160 is held in a predetermined vacuum or filled with a predetermined gas. In short, the oscillatory element 34-1 is electrically structured like a capacitor.

In the oscillatory element 34-1, when a dc bias is applied from a dc bias power supply 60 included in the bias means 14 to the lower electrode 152 and upper electrode 158, an electric field is generated in the internal space 160. The electric field tenses the thin film 156. When the magnitude of the dc bias changes, the tension of the thin film 156 varies responsively to the change. When the transmitting means 12 applies a driving signal with the thin film 156 tensed, the thin film 156 is excited with the driving signal. This causes the oscillatory element 34-1 to transmit an ultrasonic wave. On the other hand, when an echo enters the oscillatory element 34-1, the thin film 156 is excited with the echo. The excitation of the thin film 156 causes the capacity of the internal space 160 to change. The change in the capacity is fetched as a voltage, whereby the ultrasonic wave is transformed into an electric signal.

Next, the main apparatus of the ultrasonic diagnostic apparatus will be described below. The bias means 14 shown in FIG. 12 applies a dc bias to the electrodes of oscillatory elements (including, for example, the oscillatory element 34-1) included in the probe 10 in response to a command issued from the control means 21. The transmitting means 12 produces a driving signal and supplies it to the oscillatory elements (including, for example, the oscillatory element 34-1) in response to a control command. The receiving means 16 includes an amplifying means 65 for amplifying received signals sent from the probe 10, and a phasing and adding means 66 for forming a received-wave beam by phasing and adding the received signals sent from the amplifying means

65. The image processing means 18 constructs ultrasonic image data by detecting a signal sent from the receiving means 16.

The synthesizing means 24 includes a memory 68 in which ultrasonic image data sent from the image processing means 18 is stored frame by frame, and a signal adding means 73 for adding multiple image signals read from the memory 68. The memory 68 holds image signals, which represent ultrasonic image data, in association with depths. In response to a control command, an image signal associated with a designated depth is read from the memory 68. The signal adding means 73 concatenates image signals read from the memory 68 so as to produce a series of image signals. Thus, the ultrasonic image data are reconstructed. A digital scan converter 72 (hereinafter a DSC 72) is disposed as a stage succeeding the synthesizing means 24. The DSC 72 converts the ultrasonic image data sent from the synthesizing means 24 into a display signal, and transmits the display signal to the display means 20. The display means 20 includes a monitor on which an ultrasonic image sent from the DSC 72 is displayed.

Figure 16:
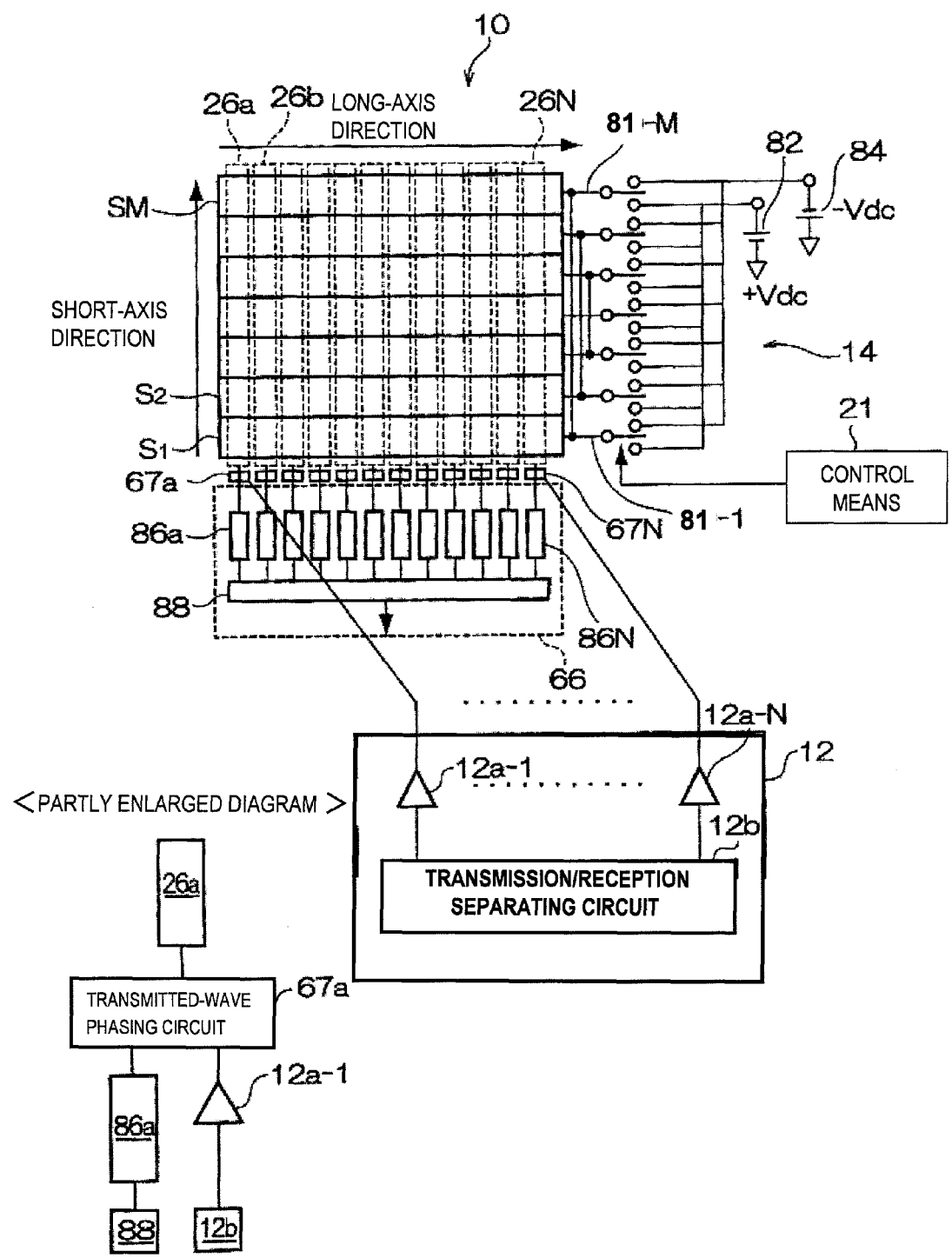
FIG. 16 shows the connection between the ultrasonic probe shown in FIG. 12 and a bias means and the connection between the ultrasonic probe and a phasing and adding means.

Connections will be described with an emphasis put on the probe 10. FIG. 16 shows the connection between the probe 10 and bias means 14, and the connection between the probe 10 and the phasing and adding means 66. For convenience's sake, the amplifying means 65 is not shown in FIG. 16. As shown in FIG. 16, the probe 10 has multiple transducers 26a to 26N juxtaposed in the long-axis direction. The lower short-axis common electrodes under the transducers 26a to 26N are grouped into multiple sets S1 to SM. N denotes the number of divisions into which the probe is divided in the long-axis direction, and M denotes the number of divisions into which the probe is divided in the short-axis direction. The bias means 14 is connected to the short-axis side of the probe 10. The bias means 14 includes multiple switches 81-1 to 81-M that are connected to the respective sets S1 to SM, and a positive bias power supply 82 and a negative bias power supply 84 connected to selection terminals of the switches 81-1 to 81-M. On the other hand, the transmitting means 12 and phasing and adding means 66 are connected to the long-axis side of the probe 10 via transmission/reception separating circuits 67a to 67N. The transmitting means 12 includes a transmitted-wave phasing circuit 12b that phases driving signals so as to produce a transmitted-wave beam, and multiple transmitted-wave drivers 12a-1 to 12a-N that supply the driving signals sent from the transmitted-wave phasing circuit 12b to the respective transducers 26a to 26N. Namely, the transmitted-wave phasing circuit included in the transmitting means 12 performs focus control so as to realize focusing of a transmitted wave on a long axis. Moreover, the phasing and adding means 66 includes multiple delay circuits 86a to 86N connected to the respective transducers 26a to 26N and a single summation circuit 88 disposed as a stage succeeding the delay circuits 86a to 86N.

The control means 21 included in the ultrasonic diagnostic apparatus having the foregoing components includes, as shown in FIG. 12, the long-axis control means 74 for narrowing the beam width in the long-axis direction, and the short-axis control means 22 for narrowing the beam width in the short-axis direction. The long-axis control means 74 performs transmitted-wave focus control, that is, delays a driving signal to be fed to the probe 10 by assigning a different phase to the driving signal for each of the transducers 26a, 26b, and so on. A received wave is subjected to dynamic focus control. The short-axis control means 22 performs Fresnel-zone bundling focus control on the basis of phase reversal data, that is, groups multiple oscillatory elements included in the probe 10 into sets (for example, sets S1 to SM shown in FIG. 16) in the short-axis direction. Moreover, a common phase is assigned to the driving signal in common for all sets so that an ultrasonic beam can be produced based only on the curvature of the acoustic lens 32. Namely, ultrasonic waves to be transmitted or received by the sets are transmitted or received while being in phase with one another. Consequently, the ultrasonic waves constitute an ultrasonic beam based only on the curvature of the convex surface of the acoustic lens. Therefore, when the convex surface of the acoustic lens is designed to exhibit a desired curvature, a focal point can be set to a relatively deep position.

Figure 17:
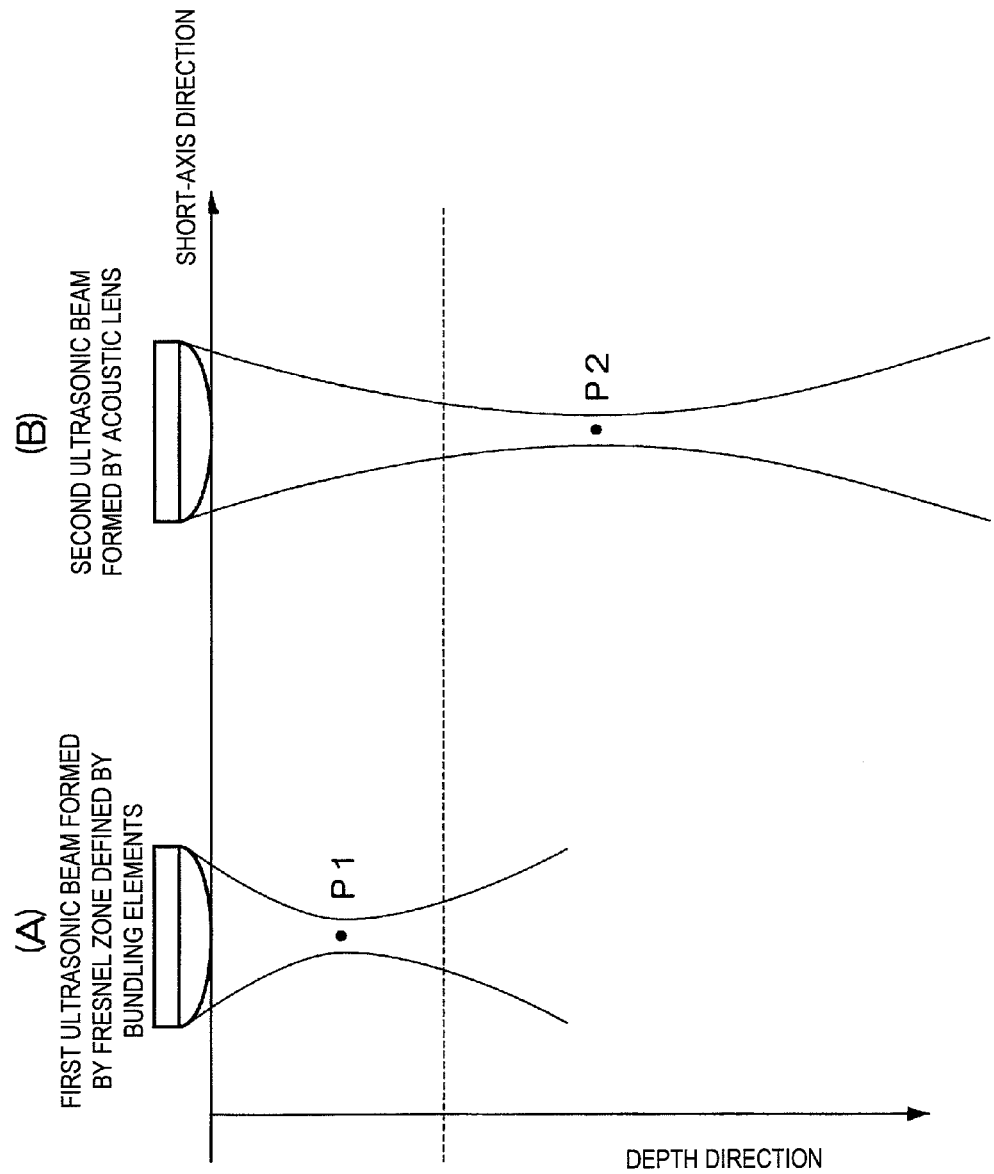
FIG. 17 shows the shapes of a first ultrasonic beam and a second ultrasonic beam which are produced under the control of a short-axis control means shown in FIG. 12.

Operations to be performed in order to improve an image resolution by narrowing a short-axis beam width will be described with an emphasis put on the short-axis control means 22 and synthesizing means 24. FIG. 17 shows the shapes of ultrasonic beams to be formed under the control of the short-axis control means 22. FIG. 17A shows a first ultrasonic beam formed by performing focus control based on Fresnel-zone bundling, while FIG. 17B shows a second ultrasonic beam formed by the acoustic lens 32.

The short-axis control means 22 executes a first step of acquiring ultrasonic image data by forming a first ultrasonic beam through focus control based on Fresnel-zone bundling, and a second step of acquiring ultrasonic image data by forming a second ultrasonic beam using the acoustic lens 32. Namely, the short-axis control means 22 executes at least one pair of transmitted-wave controls. The executing sequence of the first and second steps may be reversed. A description will be centered on transmitted-wave control. The same basically applies to received-wave control. The short-axis control means 22 issues a command to the phasing and adding means 66.

Figure 18:
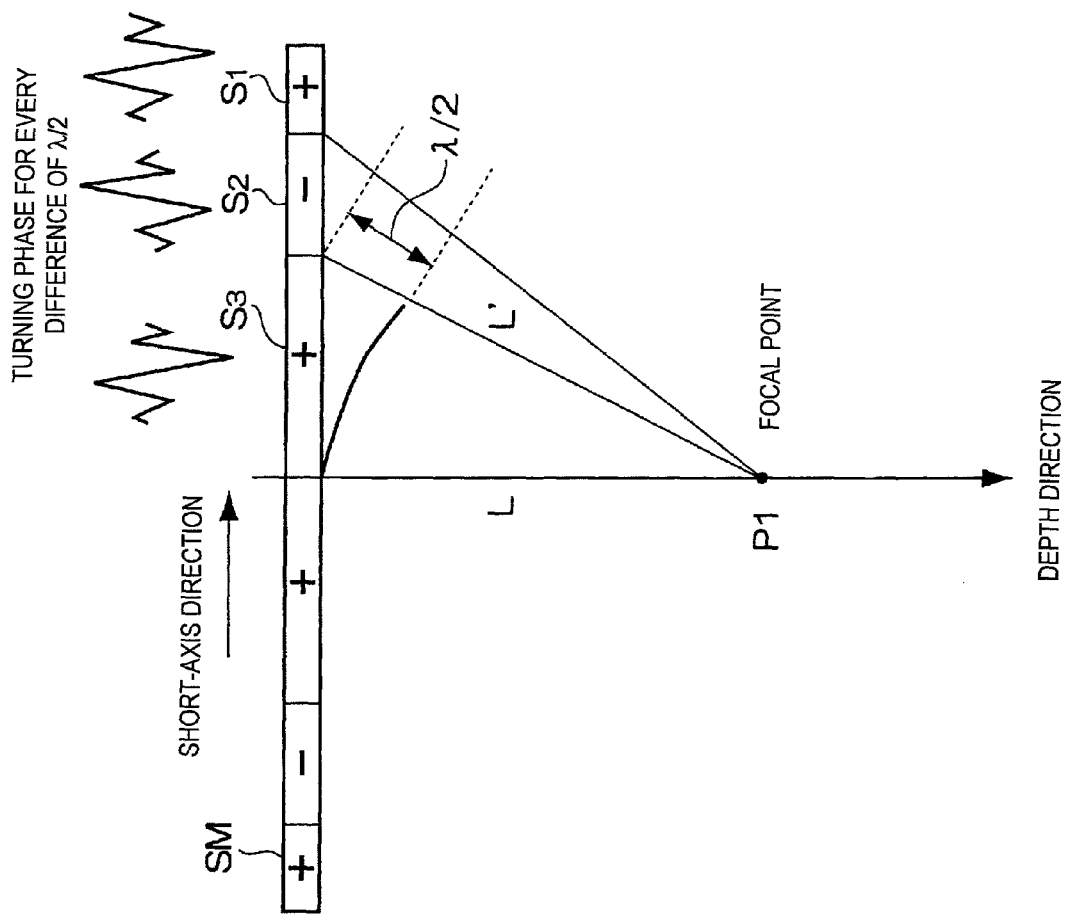
FIG. 18 is an explanatory diagram showing a Fresnel zone that is created by bundling elements in order to produce a first ultrasonic beam.

Operations to be performed in order to form a first ultrasonic beam will be described below. FIG. 18 is an explanatory diagram concerning focus control based on Fresnel-zone grouping and intended to form a first ultrasonic beam. As shown in FIG. 18, the short-axis control means 22 sets a first focal point P1 to a predetermined depth for the purpose of forming the first ultrasonic beam. The focal point P1 shall be set to a position that belongs to a near-distance region in a depth direction of a subject.

When waves transmitted from respective oscillatory elements are phased, an ultrasonic beam has the maximum intensity at the focal point P1. For example, assume that L denotes the distance from the oscillatory elements belonging to a set S3 to the focal point, and that L' denotes the distance from the oscillatory elements belonging to a set S2 adjacent to the set S3 to the focal point. Based on the distances L and L', a phase difference $\phi$ between the ultrasonic waves to be transmitted or received by the oscillatory elements belonging to the set S3 and the ultrasonic waves to be transmitted or received by the oscillatory elements belonging to the set S2 is obtained. The timing of transmitting or receiving ultrasonic waves is shifted based on the phase difference $\phi$, whereby the ultrasonic waves become in phase with one another at the focal point P1. Consequently, the ultrasonic waves are summated and mutually intensified.

For example, the short-axis control means 22 calculates the difference $\Delta L$ between the distances of adjoining sets to the focal point P1. For example, the distance from the set S3, which is located in the center of the aperture of the probe 10, to the focal point P1 is obtained as the reference distance L. Thereafter, the difference $\Delta L$ between the distance L of the set S2 adjacent to the set S3 to the focal point P1 and the reference distance L is calculated. The difference $\Delta L$ between the distance of any other set to the focal point and the reference distance L is calculated.

Thereafter, the short-axis control means 22 determines the polarity of a dc bias for each of the sets S1 to SM so as to control the phases of ultrasonic waves, which are transmitted or received by the oscillatory elements belonging to each of the sets S1 to SM, on the basis of the distance difference $\Delta L$ of each of the sets S1 to SM. In other words, the short-axis control means 22 determines the positive or negative polarity of the dc bias, which is applied to each of the sets S1 to SM, so as to shift the phases of ultrasonic waves to be transmitted, in units of $\pi$ every time the distance difference $\Delta L$ exceeds a half (½) of the wavelength $\lambda$ of ultrasonic waves. For example, when the set S3 is located in the center of the aperture, a positive bias is applied to the set S3 so that ultrasonic waves in phase with the reference wave will be transmitted from the oscillatory elements belonging to the set S3. On the other hand, a negative bias is applied to the set S2 so that ultrasonic waves in phase opposition to the reference wave will be transmitted from the oscillatory elements belonging to the set S2 adjacent to the set S3.

Figure 19:
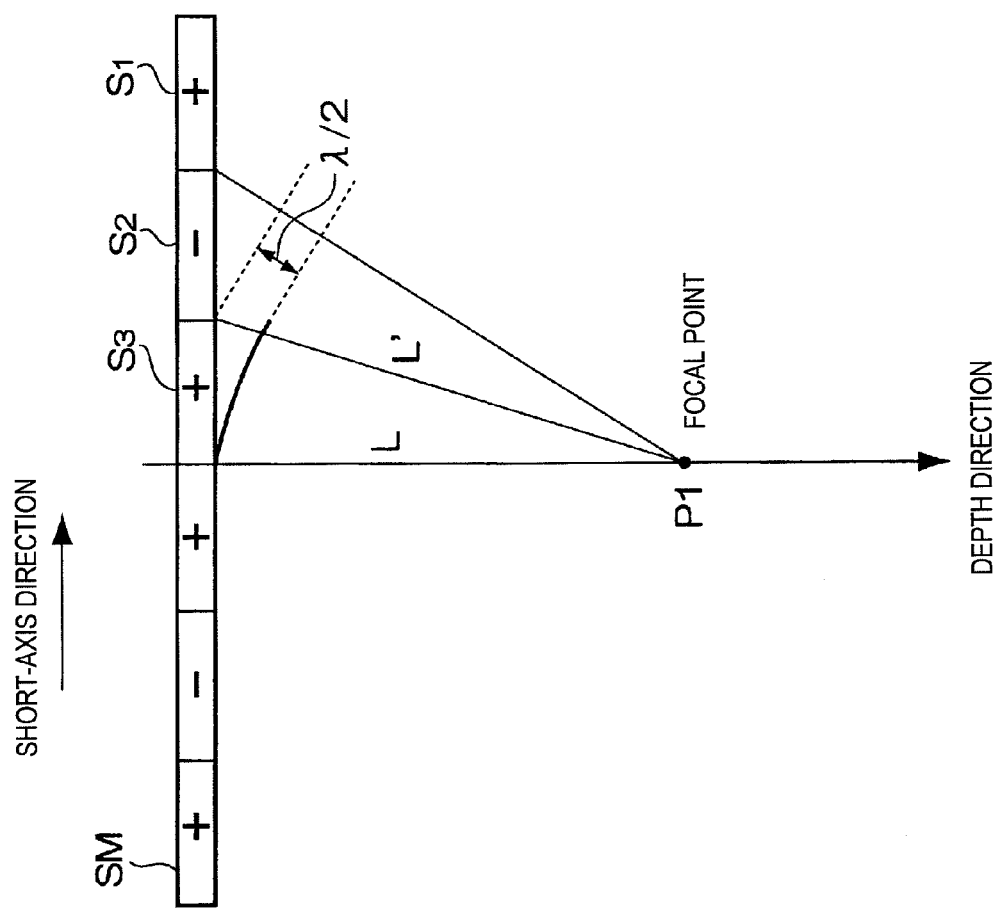
FIG. 19 shows another example of a Fresnel zone that is created by bundling elements in order to produce the first ultrasonic beam.

To be more specific, the bias means 14 determines sets (for example, the sets S3 and S1), which should transmit ultrasonic waves in phase with the reference wave, in response to a control command, and switches the terminals of the switches (for example, the switches 81-3 and 81-1), which are connected to the sets, to the terminations connected to the positive bias power supply 82. Moreover, the bias means 14 determines a set (for example, the set S2), which should transmit ultrasonic waves in phase opposition to the reference wave, in response to a control command, and switches the terminals of the switch (for example, the switch 81-2), which is connected to the set, to the terminal connected to the negative bias power supply 84. When the transmitting means 12 supplies a driving signal to each of the sets S1 to SM, the oscillatory elements belonging to the sets S1 to SM transmit ultrasonic waves. The transmitted ultrasonic waves have the phases thereof retarded in units of $\pi$ according to the polarity of the bias applied by the bias means 14. Consequently, all ultrasonic waves are phased at the focal point P1 shown in FIG. 17A or the like. In short, transmitted ultrasonic waves constitute a first ultrasonic beam that is converged at the focal point P1. Echoes of the first ultrasonic beam reflected from a subject are focused by a Fresnel zone in the short-axis direction in the same way, and subjected to predetermined processing via the probe 10. Thereafter, the echoes are stored as first ultrasonic image data in the memory 68 included in the synthesizing means 24. Formation of the first ultrasonic beam is affected by the curvature of the convex surface of the acoustic lens 32. In consideration of the curvature or the like, bundling or grouping of elements for the focal point P1 is determined. Moreover, FIG. 18 shows a form of grouping in which grouping is performed so that the widths of the lower short-axis common electrode sets will get smaller from the center of the aperture in the short-axis direction to the ends thereof. Alternatively, as shown in FIG. 19, the lower short-axis common electrodes may be grouped into sets of an equal width in the short-axis direction.

Operations to be performed in order to form a second ultrasonic beam will be described below. For formation of the second ultrasonic beam, the short-axis control means 22 generates a phase common to all the sets S1 to SM and transmits it to the bias means 14. The bias means 14 switches the terminations of the switches 81-1 to 81-M into the terminations connected to either the positive bias power supply 82 or negative bias power supply 84. When the transmitting means 12 supplies a driving signal to the oscillatory elements belonging to the sets S1 to SM, the oscillatory elements belonging to the sets S1 to SM transmit ultrasonic waves. The transmitted ultrasonic waves are converged based only on the curvature of the acoustic lens 32. Specifically, the transmitted ultrasonic waves constitute, as shown in FIG. 17, an ultrasonic beam converged at a focal point P2 deeper than the focal point P1. Echoes of the second ultrasonic beam reflected from a subject are subjected to predetermined processing via the probe 10, and then stored as second ultrasonic image data in the memory 68 included in the synthesizing means 24.

FIG. 20 is an explanatory diagram concerning the operation of the synthesizing means 24. FIG. 20A is a conceptual diagram of an image signal that is a component of a signal received in return for the first ultrasonic beam and expresses a shallow region of a subject. FIG. 20B is a conceptual diagram of an image signal that is a component of a signal received in return for a second ultrasonic beam and expresses a deep region of the subject. FIG. 20C is a conceptual diagram of an image signal carrying ultrasonic image data and being produced by the synthesizing means 24. For a better description or clearer illustration, the image signals shall stem from a single scanning line.

The synthesizing means 24 samples an image signal, which expresses a shallow region of a subject, from a signal received in return for the first ultrasonic beam, and reads the image signal. Specifically, as shown in FIG. 20A, an image signal expressing a near-distance region is read after being sampled from the signal received in return for the first ultrasonic beam. Moreover, the synthesizing means 24 samples an image signal, which expresses a deep region of the subject, from a signal received in return for the second ultrasonic beam, and reads the image signal. Specifically, as shown in FIG. 20B, an image signal expressing a far-distance region is read after being sampled from the signal received in return for the second ultrasonic beam. As shown in FIG. 20C, the synthesizing means 24 joins the image signal, which expresses the near-distance region, and the image signal, which expresses the far-distance region, to produce as a synthetic signal an image signal stemming from one scanning line. The same applies to the other scanning lines. The synthetic signal is fed from the synthesizing means 24 and handled by the DSC 72. Consequently, an ultrasonic image is displayed on the display means 20.

According to the present embodiment, a signal expressing a shallow region and being a component of a synthetic signal produced by the synthesizing means 24 is derived from a portion of an ultrasonic beam whose width is relatively narrowed through focus control based on a Fresnel zone defined by bundling elements. On the other hand, a signal expressing a deep region and being a component of the synthetic signal is derived from a portion of an ultrasonic beam whose width is relatively narrowed by the acoustic lens 32. Consequently, the synthetic signal is a signal that benefits from the high sensitivity to the region of a subject ranging from the shallow region to the deep region and that is excellent enough for image reconstruction. An ultrasonic image represented by the synthetic signal exhibits a high image resolution or improved quality, and can faithfully express the subject ranging from the shallow region to the deep region.

Namely, the ultrasonic diagnostic apparatus in accordance with the present embodiment uses in combination focusing in the short-axis direction to be achieved through focus control based on a Fresnel zone defined by bundling elements and focusing in the short-axis direction to be achieved by the acoustic lens 32. Consequently, a short-axis beam width is narrowed and a high-quality ultrasonic image is displayed.

In the present embodiment, the phases of ultrasonic waves are retarded in units of $\pi$ merely by reversing the polarity of a dc bias. This is because elements represented by capacitive micromachined ultrasonic transducers (cMUTs) are used as the oscillatory element 34-1. This obviates the necessity of preparing a delay circuit (phasing circuit) for each of the sets S1 to SM. An increase in a circuit scale can be suppressed.

Moreover, for production of a synthetic signal, the synthesizing means 24 shown in FIG. 12 may include a luminance correcting means 71 for matching the intensity (luminance information) of an image signal expressing a near-distance region with the intensity (luminance information) of an image signal expressing a far-distance region. FIG. 21 is an explanatory diagram concerning the operation of the luminance correcting means 71 included in the synthesizing means 24. As shown in FIG. 21A, a signal received in return for the first ultrasonic beam has the intensity thereof maximized at a focal point P1. On the other hand, as shown in FIG. 21B, a signal received in return for the second ultrasonic beam has the intensity thereof maximized at a focal point P2. In this case, when the signal expressing the near-distance region and being a component of the signal shown in FIG. 21A and the image signal expressing the far-distance region as shown in FIG. 21B are joined, a difference in intensity, that is, a gap in luminance may occur at the joint as shown in FIG. 21C. The gap in luminance is manifested as noise in an ultrasonic image. When the signals are joined, the luminance correcting means 71 multiplies an image signal, which expresses the joint, by a weigh coefficient (luminance correction coefficient) for the purpose of minimizing the gap in luminance at the joint as shown in FIG. 21D. For example, the luminance correcting means 71 increases the weight coefficient along with an increase in the gap in luminance, and multiplies the signal of the joint by the weight coefficient. Thus, the gap in luminance is minimized.

Moreover, in the present embodiment, the transducers 26a to 26N are, as shown in FIG. 16, equally divided into the sets S1 to SM in the short-axis direction. Alternatively, the transducers 26a to 26N may be unequally divided thereinto. For example, a predetermined frequency of a driving signal or predetermined focus data may be used as a reference, and the transducers 26a to 26N may be divided into sets in the short-axis direction in order to define a Fresnel zone. Moreover, the transducers 26a to 26N may be divided into sets so that the widths of the sets S1 to SM will get smaller from the center of the aperture in the short-axis direction to the ends thereof. In this case, a sharper beam can be produced. Moreover, when the transducers 26a to 26N are equally divided, as the number of divisions is increased, the precision in defining a Fresnel zone improves. This leads to the improved precision in focusing. Moreover, an ultrasonic beam is accompanied by a grating lobe not only in the long-axis direction but also in the short-axis direction. By increasing the number of divisions into which the transducers 26a to 26N are each divided, an angle at which the grating lobe meets a main lobe is decreased. Consequently, noise occurring in an ultrasonic image can be minimized. Moreover, the switches 81-1 to 81-M are connected symmetrically in the short-axis direction with the center of the short axis as a reference in efforts to minimize a circuit scale. The present invention is not limited to the connection.

FIG. 22 shows patterns of ultrasonic beams to be transmitted or received by the probe 10 included in the present embodiment together with patterns of comparative examples. FIG. 22A shows comparative examples of ultrasonic beams focused using only an acoustic lens. FIG. 22B shows comparative examples of ultrasonic beams focused using only a Fresnel zone defined by bundling elements. FIG. 22C shows examples of ultrasonic beams to be transmitted or received by the probe 10 included in the present embodiment. Incidentally, the axis of abscissas of each graph is associated with the short-axis direction, while the axis of ordinates indicates beam intensity values.

For the comparative examples shown in FIG. 22A, an ultrasonic frequency is designed to be 10 MHz, the length of a short axis aperture is designed to be 10 mm, and the focal length to an acoustic lens is designed to be 15 mm. The calculated patterns of beams focused on respective depths (of, for example, 15 mm, 25 mm, and 45 mm) are shown in FIG. 22A. As shown in FIG. 22A, the beam width at the focal point (15 mm) is narrowed, but the beam width at the point (45 mm) deeper than the focal point is enlarged. The enlargement causes a decrease in a sensitivity that is reflected in an image signal expressing a deep region of a subject. Moreover, for the comparative examples shown n FIG. 22B, the ultrasonic frequency is designed to be 10 MHz, the length of the short axis aperture is designed to be 10 mm, and the focal length to a Fresnel zone is designed to be 15 mm. The patterns of beams at the respective depths are calculated. As shown in FIG. 22B, the beam width at the focal point (15 mm) is narrowed, but the beam width at the point (45 mm) deeper than the focal point is enlarged. FIG. 22C shows examples in which: transducers are each divided into sets along the short axis; driving signals to be fed to the sets have the same phase; and an ultrasonic beam is focused on a far-distance point using only a lens. At the depth of 45 mm, a satisfactory pattern is obtained. At the other depths, patterns are degraded.

For the examples shown in FIG. 22D, the ultrasonic frequency is designed to be 10 MHz, the length of the short axis aperture is designed to be 10 mm, the focal length to a Fresnel zone is designed to be 15 mm, and the focal length to a lens is designed to be 45 mm. Patterns of beams focused on the respective depths are calculated. As shown in FIG. 22D, compared with the beam patterns shown in FIG. 22A, FIG. 22B, and FIG. 22C, satisfactory ultrasonic beams having the widths thereof narrowed at the respective points are formed. Namely, the probe 10 included in the present embodiment can realize both focusing to be achieved using the acoustic lens 32 and focusing to be achieved using a Fresnel zone defined by bundling or grouping elements. Moreover, the Fresnel zone defined by bundling elements may be adopted in the same manner as it is to obtain the patterns shown in FIG. 22D during the first transmission of ultrasonic waves, and focusing may be performed using only the lens during the second transmission of ultrasonic waves. The satisfactory portions of the patterns shown in FIG. 22C and FIG. 22D may then be synthesized in order to produce a more satisfactory beam. Consequently, a beam width in the short-axis direction can be narrowed at points lying over a shallow region of a subject and a deep region thereof alike. This results in the improved quality of an ultrasonic image expressing any region of a subject ranging from the shallow region to the deep region.

In the present embodiment, the phases of ultrasonic waves may be mismatched due to so-called rounding or rounding down of a microscopic phase difference. When a phase mismatch occurs, a beam width gets relatively larger. An ultrasonic beam including an unnecessary response component is produced. A method in which the width of each set (pitch) is varied depending on the depth position of the focal point P and the wavelength λ of ultrasonic waves in order to minimize a phase mismatch derived from rounding will be described below in relation to the third embodiment.

(Third Embodiment)

The third embodiment of an ultrasonic diagnostic apparatus to which the present invention is applied will be described with reference to drawings. The present embodiment attempts to further improve the quality of an ultrasonic image by improving an azimuthal resolution in the short-axis direction. Specifically, the present embodiment is different from the aforesaid embodiments, in which the widths of sets S1 to SM are fixed, in a point that the widths (pitch) of the sets S1 to SM are varied depending on the depth position of the focal point P1 and the wavelength λ of ultrasonic waves.

Referring to FIG. 12 and FIG. 18, when oscillatory element groups arrayed in the short-axis direction is grouped into multiple sets S1 to SM, assuming that the distance L of one set (for example, the set S3) to the focal point P1 is regarded as a reference distance, the short-axis control means 22 calculates the difference ΔL between the distance L' of any other set (for example, the set S2) to the focal point and the reference distance. The short-axis control means 22 then changes the pitch between adjoining ones of the sets S1 to SM by determining the number of sets and the numbers of oscillatory elements belonging to the sets so that the distance difference ΔL will fall within a range designated with an integral multiple of a half (½) of the wavelength λ of ultrasonic waves as a reference.

According to the present embodiment, even when the position of the focal point P1 is changed from one to another, the distance difference ΔL can be set to a predetermined value accordingly. Consequently, it suffices to prepare a Fresnel bundling pattern corresponding to the predetermined distance difference ΔL and phase reversal data. Eventually, an increase in the number of focus data can be suppressed.

(Fourth Embodiment)

The fourth embodiment of an ultrasonic diagnostic apparatus to which the present invention is applied will be described below.

The present embodiment is an example in which a first ultrasonic beam and a second ultrasonic beam are produced using a Fresnel zone defined by bundling elements. Specifically, in the present embodiment, a Fresnel zone defined by bundling elements is used to produce an ultrasonic beam narrowed at a focal point P2 whose depth is larger than the depth of a focal point P1. Echoes of the second ultrasonic beam, which is produced using a Fresnel zone defined by bundling elements, reflected from a subject are subjected to predetermined processing by way of the probe 10, and then stored as second ultrasonic image data in the memory 68 included in the synthesizing means 24. The first ultrasonic beam is handled as described previously. An iterative description will be omitted.

A signal that is a component of a synthetic signal produced by the synthesizing means 24 and expresses a shallow region, and a signal that is a component thereof and expresses a deep region are derived from a portion of a beam whose width is relatively narrowed through focus control based on a Fresnel zone defined by bundling elements.

The present invention has been described by presenting the first to fourth embodiments. The present invention is not limited to the embodiments. For example, a description has been made mainly of an azimuthal resolution in the short-axis direction to be determined with an ultrasonic beam. The present invention can be applied to an attempt of improving an azimuthal resolution in the long-axis direction. However, focus control in which the long-axis control means 74 delays ultrasonic waves for each of the transducers 26a, 26b, etc. is generally adopted for the azimuthal resolution in the long-axis direction to be determined with the ultrasonic beam. In this case, phasing employed in the embodiments may be adopted in combination with or in place of the focus control.

The invention claimed is:

1. An ultrasonic diagnostic apparatus comprising:
   an ultrasonic probe that transmits or receives ultrasonic waves to or from a subject, the ultrasonic probe comprising a plurality of oscillatory elements;
   a transmitting means configured to supply a driving signal to the ultrasonic probe;
   a receiving means configured to receive a signal sent from the ultrasonic probe;
   a means configured to reconstruct an ultrasonic image on the basis of a signal sent from the receiving means;
   a means configured to display the ultrasonic image;
   an element selecting means configured to select a plurality of driving oscillatory elements, which defines an aperture through which ultrasonic waves are transmitted or received, from among the plurality of oscillatory elements, and groups the plurality of driving oscillatory elements into a plurality of sets, each of which includes one driving oscillatory element or a plurality of adjoining driving oscillatory elements and transmits or receives ultrasonic waves, according to the depth of a focal point,
   wherein the element selecting means regards as a reference distance the distance of a set, which is located in the center in a short-axis direction of the probe, to the focal point, calculates a difference between a distance of any other set to the focal point and the reference distance, determines the number of sets, and groups all of the selected driving oscillatory elements into the plurality of sets more broadly for the case of a focal point of a large depth than those for the case of a focal point of a small depth so that the distance difference will fall within a permissible range designated based on a wavelength λ of ultrasonic waves.

2. The ultrasonic diagnostic apparatus according to claim 1, wherein the element selecting means determines the number of sets and the numbers of driving oscillatory elements belonging to the sets so that the distance difference will be within a permissible range designated with an integral multiple of a half (½) of the wavelength λ of ultrasonic waves as a reference.

3. The ultrasonic diagnostic apparatus according to claim 1, wherein the element selecting means issues a command, with which the driving signal is fed to the determined sets and the driving oscillatory elements belonging to the sets, to the transmitting means.

4. The ultrasonic diagnostic apparatus according to claim 1, wherein a sensitivity of the oscillatory element to an ultrasonic wave being received or transmitted varies depending on the measure of a bias voltage that is applied while being convoluted to the driving signal, and the oscillatory elements are manufactured by a semiconductor microfabrication process.

5. The ultrasonic diagnostic apparatus according to claim 1, wherein the plurality of oscillatory elements are arrayed at least in the short-axis direction of the probe, and the element selecting means groups the driving oscillatory elements into a plurality of sets in the short-axis direction.

6. The ultrasonic diagnostic apparatus according to claim 1, wherein:
   the transmitting means supplies a first driving signal to the driving oscillatory elements which belong to a set located in the center in the short-axis direction, and supplies a second driving signal to the driving oscillatory elements belonging to other sets; and the second driving signal is produced by turning the phase of the first driving signal according to the distance difference.

7. The ultrasonic diagnostic apparatus according to claim 1, further comprising a focus control means for controlling phases of ultrasonic waves in units of a set so as to produce a first ultrasonic beam having a first focus and a second ultrasonic beam having a second focus whose depth is larger than the depth of the first focus, and a synthesizing means for joining a signal, which expresses a shallow region of the subject and is a component of a signal received in return for the first ultrasonic beam, and a signal, which expresses a deep region of the subject and is a component of a signal received in return for the second ultrasonic beam, so as to produce ultrasonic image data.

8. An ultrasonic diagnostic apparatus comprising:
   an ultrasonic probe that transmits or receives ultrasonic waves to or from a subject;
   a transmitting means configured to supply a driving signal to the ultrasonic probe,
   a receiving means configured to receive a signal sent from the ultrasonic probe;
   an image processing means configured to reconstruct an ultrasonic image on the basis of a signal sent from the receiving means, and
   a display means configured to display the ultrasonic image, wherein:
   the ultrasonic probe has a plurality of oscillatory elements arrayed rectangularly, includes opposite electrodes that are grouped in a short-axis direction orthogonal to an axis of the rectangular array, and has an acoustic lens disposed on an ultrasonic-wave transmitting/receiving side thereof;
   the ultrasonic diagnostic apparatus further comprising:
   a focus control means configured to group the opposite electrodes, which are grouped in the short-axis directions, into a plurality of sets, controlling the phases of ultrasonic waves in units of a set so as to produce a first ultrasonic beam having a first focus, and using the acoustic lens to produce a second ultrasonic beam having a second focus whose depth is larger than the depth of the first focus; and
   a synthesizing means configured to join a signal, which expresses a shallow region of a subject and is a component of a signal received in return for the first ultrasonic beam, and a signal, which expresses a deep region of the subject and is a component of a signal received in return for the second ultrasonic beam, so as to produce ultrasonic image data,
   wherein the focus control means regards as a reference distance the distance of one of the plurality of sets to a focal point, calculates a difference between a distance of any other set to the focal point and the reference distance, determines a number of sets, and groups all of a plurality of selected driving oscillatory elements into the plurality of sets more broadly for the case of a focal point of a large depth than those for the case of a focal point of a small depth so that the distance difference will fall within a range designated with an integral multiple of a half (½) of a wavelength λ of ultrasonic waves as a reference so as to vary a pitch between the sets.

9. The ultrasonic diagnostic apparatus according to claim 8, wherein the focus control means assigns a different phase in units of a set so as to produce the first ultrasonic beam, and assigns a common phase for all sets so as to produce the second ultrasonic beam.

10. The ultrasonic diagnostic apparatus according to claim 8, wherein the focus control means extends control so that the first focus will be located at a nearer distance than the second focus is.

11. The ultrasonic diagnostic apparatus according to claim 8, wherein the ultrasonic probe has the oscillatory elements arrayed at least in the short-axis direction.

12. The ultrasonic diagnostic apparatus according to claim 8, wherein:
   an electromechanical coupling coefficient of the oscillatory element varies depending on the measure of an applied dc bias; and
   when the polarity of the dc bias is reversed, the amplitude of an ultrasonic wave to be transmitted or received is reversed.

13. An ultrasonic diagnostic apparatus comprising:
   an ultrasonic probe that transmits or receives ultrasonic waves to or from a subject, the ultrasonic probe comprising a plurality of oscillatory elements;
   a transmitting means configured to supply a driving signal to the ultrasonic probe;
   a receiving means configured to receive a signal sent from the ultrasonic probe;
   a means configured to reconstruct an ultrasonic image on the basis of a signal sent from the receiving means; and
   an element selecting means configured to select a plurality of driving oscillatory elements, which defines an aperture through which ultrasonic waves are transmitted or received, from among the plurality of oscillatory elements, and groups the plurality of driving oscillatory elements into a plurality of sets, each of which includes one driving oscillatory element or a plurality of adjoining driving oscillatory elements, in response to positional changes of the focal point,
   wherein the element selecting means groups all of the selected driving oscillatory elements into the plurality of sets more broadly for the case of a focal point of a large depth than those for the case of a focal point of a small depth without changing the size of the aperture.

14. An ultrasonic diagnostic apparatus comprising:
   an ultrasonic probe that transmits or receives ultrasonic waves to or from a subject, the ultrasonic probe comprising a plurality of oscillatory elements;
   a transmitting means configured to supply a driving signal to the ultrasonic probe;
   a receiving means configured to receive a signal sent from the ultrasonic probe;
   a means configured to reconstruct an ultrasonic image on the basis of a signal sent from the receiving means;
   a means configured to display the ultrasonic image;
   an element selecting means configured to select a plurality of driving oscillatory elements to define an active aperture, through which ultrasonic waves are transmitted or received, from among the plurality of oscillatory elements, and groups the plurality of driving oscillatory elements into a plurality of sets, each of which includes one driving oscillatory element or a plurality of adjoining driving oscillatory elements and transmits or receives ultrasonic waves, according to the depth of a focal point,
   wherein the element selecting means regards as a reference distance the distance of a set, which is located in the center in a short-axis direction of the probe, to the focal point, calculates a difference between a distance of any other set to the focal point and the reference distance, determines the number of sets, and groups the plurality of driving oscillatory elements into the plurality of sets more broadly for the case of a focal point of a large depth than those for the case of a focal point of a small depth without changing the size of the active aperture so that the distance difference will fall within a permissible range designated based on a wavelength $\lambda$ of ultrasonic waves.

* * * * *